(12) United States Patent
Rauch

(10) Patent No.: US 8,942,859 B2
(45) Date of Patent: Jan. 27, 2015

(54) GUIDANCE AND SECURITY SYSTEM FOR COMPLEX TRANSPORT SYSTEMS

(75) Inventor: Jurgen Rauch, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1459 days.

(21) Appl. No.: 11/573,815

(22) PCT Filed: Aug. 18, 2005

(86) PCT No.: PCT/EP2005/008955
§ 371 (c)(1),
(2), (4) Date: Dec. 18, 2007

(87) PCT Pub. No.: WO2006/018304
PCT Pub. Date: Feb. 23, 2006

(65) Prior Publication Data
US 2008/0195257 A1 Aug. 14, 2008

(30) Foreign Application Priority Data
Aug. 18, 2004 (DE) .......................... 10 2004 040 057

(51) Int. Cl.
*G05D 1/00* (2006.01)
*G05D 3/00* (2006.01)
*G06F 7/00* (2006.01)
*G06F 19/00* (2011.01)
(Continued)

(52) U.S. Cl.
CPC *G07C 9/00* (2013.01); *G06Q 10/06* (2013.01); *G07C 2011/02* (2013.01); *G08G 1/005* (2013.01); *B61B 1/02* (2013.01); *G08G 1/127* (2013.01)

USPC .............................................. 701/1; 701/117

(58) Field of Classification Search
USPC ...................................................... 701/1, 117
See application file for complete search history.

(56) References Cited

U.S. PATENT DOCUMENTS 3,587,472 A 6/1971 Bissett
3,788,232 A 1/1974 Schneider et al.
(Continued)

FOREIGN PATENT DOCUMENTS

DE 20202616 6/2002
EP 0 823 821 A2 2/1998
(Continued)

*Primary Examiner* — Imran Mustafa
(74) *Attorney, Agent, or Firm* — Laurence A. Greenberg; Werner H. Stemer; Ralph E. Locher

(57) ABSTRACT

The present invention provides a guidance and security system for transport means, in particular complex mass transport systems, in which automatic passenger counting, security monitoring, for example, against fire, crime and terrorism, control of the use of individual elements of the transport system, such as vehicles, trains etc., automatic monitoring of the track and passenger information are connected with each other by an electronic "backbone". The system comprises at least one guidance means for at least one transport means an/or for people, several recording units and a central unit. The central unit is connected to the recording units and the guidance means. The recording units are for determining the number of people located at a particular time and in a particular spatial area such that the central unit can control the guidance means depending thereon, in order that the appropriate number of vehicles is automatically provided with the necessary frequency and to guide passengers to the vehicle entrances.

15 Claims, 11 Drawing Sheets

(51) Int. Cl.
*G06G 7/70* (2006.01)
*G06G 7/76* (2006.01)
*G08G 1/00* (2006.01)
*G07C 9/00* (2006.01)
*G08G 1/005* (2006.01)
*B61B 1/02* (2006.01)
*G08G 1/127* (2006.01)
*G06Q 10/06* (2012.01)
*G07C 11/00* (2006.01)

(56) References Cited

U.S. PATENT DOCUMENTS

| | | | |
|---|---|---|---|
| 4,092,718 A | 5/1978 | Wendt | |
| 5,176,082 A | 1/1993 | Chun et al. | |
| 6,681,174 B1 | 1/2004 | Harvey et al. | |
| 6,741,175 B1 * | 5/2004 | Rauch | 340/541 |
| 6,958,707 B1 * | 10/2005 | Siegel | 340/902 |
| 2002/0070863 A1 * | 6/2002 | Brooking | 340/572.1 |
| 2002/0168084 A1 * | 11/2002 | Trajkovic et al. | 382/100 |
| 2004/0052405 A1 | 3/2004 | Walfridsson | |
| 2004/0088104 A1 * | 5/2004 | Izbicki et al. | 701/117 |
| 2004/0169076 A1 * | 9/2004 | Beale et al. | 235/382 |

FOREIGN PATENT DOCUMENTS

| | | |
|---|---|---|
| EP | 0941527 | 9/1999 |
| EP | 1 306 815 A1 | 5/2003 |
| FR | 2 786 302 A1 | 5/2000 |
| JP | 2000-020759 | 1/2000 |
| JP | 2000-295167 | 10/2000 |
| JP | 2000-344105 | 12/2000 |
| JP | 2003021533 | 1/2003 |
| JP | 2003-196686 | 7/2003 |
| JP | 2003-291814 | 10/2003 |

* cited by examiner

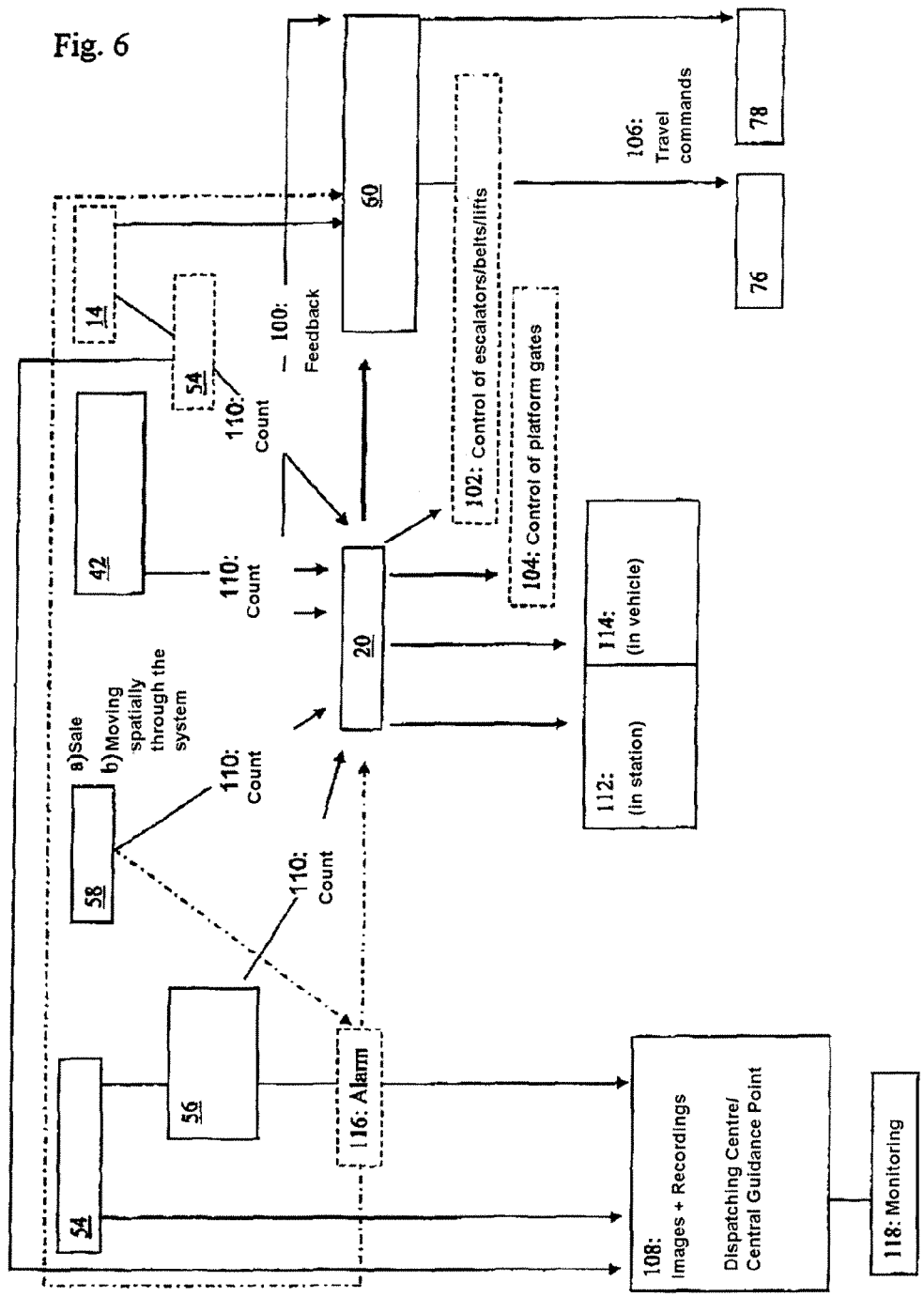

Fig. 8
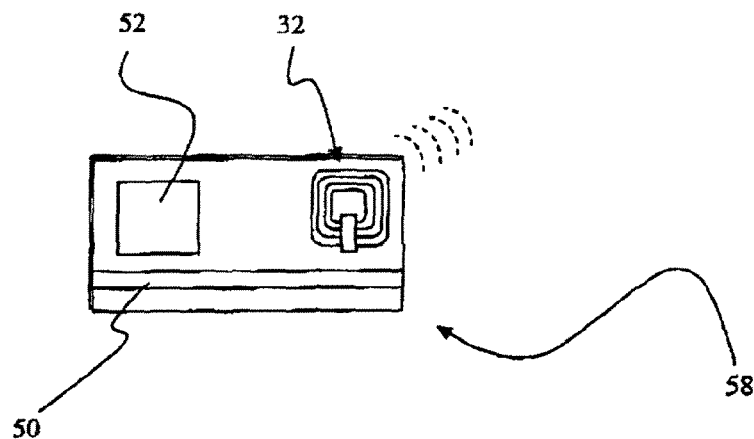
Fig. 9
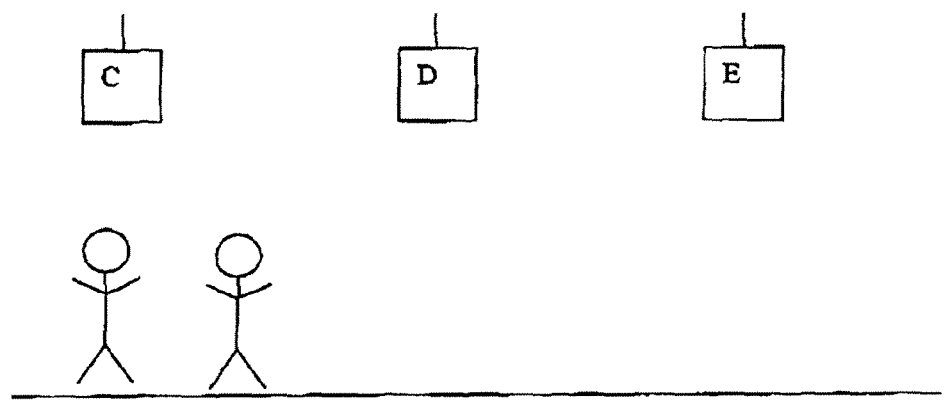
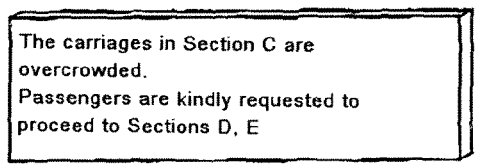

Fig. 12    Fig. 12 a
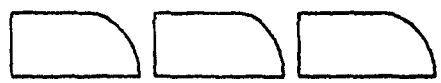   12.1
   12.2
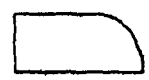   12.3
} 12.4
Fig. 12 b
   12.5
   12.6
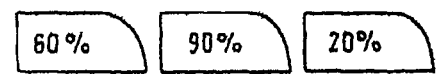   12.7
80 %   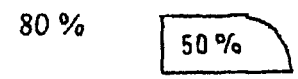   20 %   12.8

GUIDANCE AND SECURITY SYSTEM FOR COMPLEX TRANSPORT SYSTEMS

1. TECHNICAL FIELD

The present invention relates to a transport guidance system having various arrangements for the controlling and monitoring of transport means and the guidance of people. In particular, the present invention also relates to a guidance and security system with a vehicle path security system.

2. RELATED ART

The starting point of the problem on which the invention is based is the current state of transport systems, particularly mass transport systems, which is characterized by congestion and security problems, and also by great capacity problems. Often, the controlling of the transport systems can not keep up with their growth. In these transport systems, particularly metro and suburban train systems, peaks of traffic occur daily, which can lead to capacity bottlenecks and in many places also to breakdowns in the system. It is frequently to be observed that passengers only board an underground train, for example, at a few locations, especially in the vicinity of access points such as escalators, even though the train also has several more doors which, however, are not used. In order to also use other doors to board the train, the passenger would have to cover a distance from the escalator along the platform. Understandably, passengers avoid unnecessary distances, especially also because the lengths of time for stops are becoming shorter and many drivers do not wait until individual passengers have arrived at doors situated further to the back. So as not to miss the train, the majority of passengers therefore prefer to board at the door closest to them, despite the prevailing crowds, i.e. generally in the immediate vicinity of the access points to the platform. The length of time for which the train is stationary is thereby increased, of course, and especially in the case trains which do not have an internal passageway the occupancy is irregular, so that the passengers are crowded in one part of the train, whereas other parts of the train remain empty or less occupied.

Unnecessarily lengthened stationary times therefore lead to a distinct reduction in passenger transporting efficiency. In some circumstances, it can thereby appear that an expansion of the respective means of transport is required, which in reality would not be necessary. In the case of such a superfluous expansion, resources are then wasted on a large scale, new routes are constructed, more trains are purchased etc.

Operators of transport systems are, moreover, increasingly facing the need to determine precisely the number of people located in a means of transport, particularly a rail vehicle, according to the distance traveled, at a particular time. There are various reasons for this. One reason lies in establishing the efficiency of a route, i.e. to clarify the question as to whether the transport which is on offer is taken up, or whether it is worth operating particular sections of a route at all; an additional reason, however, is for accounting. This applies in particular when several operators cooperate in an integrated public transport system and fares have to be distributed between the operators according to the transport revenue.

A precise count with as fast a transmission of the results as possible to a guidance point or to an automatic system is also necessary if a reaction to an increased number of passengers is to be undertaken when required, i.e. if for example additional trains are to be put on, preferably automatically, after the end of a large event (concert, football match). Only as accurate a count of passengers as possible makes it possible for the transport operator to work in line with requirements, i.e. to save on excess trains and, in so doing, to save costs. It is desirable here to be informed of an increased influx of passengers as early as possible. Counts in driverless, automatic mass transport systems also offer the possibility here of putting on additional trains promptly, without having to use drivers, so that a reaction can be undertaken quickly. In systems which count the number of passengers by the number of passengers boarding and disembarking, of course it can not be prevented that after such a large event crowding occurs in stations and on platforms etc. However, a recording of the numbers of passengers already in the approaching area would help to prevent this. As local transport in most countries (particularly EU countries) is subsidized by public funds, a precise recording is required for the correct and proper use of tax revenue.

Through a more intelligent distribution of the passengers on a platform, the boarding time in stopping mass transport means, particularly trains, can be further reduced and, in so doing, the passenger changeover time as a whole can be shortened. Consequently, the frequency of the vehicles can be increased. In addition, the occupancy of the train becomes more regular, i.e. for example, the available space and/or the seats are better utilized. Through reduced stationary periods, substantially more trains can stop at the station per unit of time, and people situated in and streaming into the station can be transported on in higher numbers per time or at a greater speed.

The fundamental principle of a transport guidance system in accordance with this has already been disclosed in European Patent EP 0941527. In this publication, the technical teaching extends to the optimum guiding and distribution of people, in order to increase the capacity of the transport means. The present invention goes beyond this and extends to the automatic provision of vehicle capacities and increasing the security thereof.

Non-contact card systems, access controls etc. are known in the prior art. Likewise, it is known in department stores to monitor goods which are at risk of theft or are expensive by small transmitters or metal receivers, which trigger an alarm when passing through a barrier at the exit from the shop, if they have not been deactivated when payment was made. Likewise, cards are known which, on payment of the entry price are equipped with a magnetic strip or a chip. The form of the card with the chip or suchlike can be used in such a way to verify authorized access, so that passing by the barrier is already sufficient, without requiring direct contact of the card with the reader apparatus, as is still necessary in the case of the magnetic strip. Such cards are equipped with a chip or a small transmitter which communicates with the reader apparatus via a magnetic field or via radio and clears access. The device also serves for control and in particular for security against forgery. The cost of a minichip, e.g. for Euro notes is currently approximately 20 cents (€0.20). A large number of chips, for instance for every ticket of an integrated public transport system in a city can reduce these costs still further.

Various counting and transmission methods exist; depending on the technology which is used, they provide better (more precise) or less precise counting results. However, they are never strictly precise as regards people, because they entail greater or lesser inaccuracy due to the system. By estimating accordingly, the operator or a person responsible for security can obtain an overview of how many people are to be found in a metro train or in a metro station at a given moment in time.

However, it is not possible in this way to find people who have stopped, possibly without permission, at critical locations, e.g. in the tunnel system (e.g. rail tunnel or route tunnel) outside a train or the station area. A count of the people entering and leaving at (few) defined entries and exits can not ensure that it is detected whether and when people possibly do not go through the entries and exits which are provided, but rather leave trains in a different way, climbing out of a window for example, or passing through a barrier which is inadvertently open. Therefore, it is not possible for rescue services in a disaster to locate people precisely and to find them in a short space of time, which may be crucial. A prior warning can also take place, if someone moves without authorization into areas which are critical for security, e.g. to possible cause damage.

In vehicle traffic on travel pathways it is traditionally assumed that the driver of the vehicle surveys the state and passability of the pathway during the journey by looking ahead, and if necessary brings the vehicle to a standstill to reduces the speed accordingly if there is no guarantee of safety in passing an obstacle, or if the state of the pathway or of a vehicle driving ahead is insufficient. This assumes that the speed of travel is matched to the visual conditions for the driver, the shape of the pathway (visibility etc.) and other conditions (weather), which in turn minimizes the efficiency (capacity) of a transport route and of the transport route/vehicle system and extends the journey or travel time.

Both in transport with rail vehicles and also on the roads, technical aids have been developed which assist the driver beyond the possibilities of his own eyesight and inform him of the passability of the route for a certain section and a certain speed (rail transport) and/or initiate and carry out, without his intervention, a reduction in speed, if necessary down to zero, and also keep a safety distance from a vehicle which is travelling ahead.

Amongst these known traffic safety measures in rail transport are, inter alia, the system of signal release of route sections or block sections, systems such as INDUSI (inductive train safety device), LZB (automatic train-running control), moving block (prior art, e.g. Maggaly system, with speed-dependent distance control), driving on electronic vision. These systems are supplemented and supported by internal detection systems which detect problems in the operation, such as monitoring the overheating of engines and brakes, drop in pressure etc., and which either inform the driver or (particularly in rail transport) bring the vehicle to a standstill even without the intervention of personnel.

These above-mentioned systems which are the prior art, lack an automatic obstacle detection. Block line clear detections generally refer to vehicles which are travelling ahead, but not to the freedom from obstacles on the route, i.e. freedom from other objects which constitute a danger to safety when travelling through. Also, the state, safety and freedom from obstacles of asphalt and concrete roadways can not yet be announced automatically to individual vehicles.

The increase in safety and efficiency in line clear detections is also necessary and desirable for the following reasons. In rail transport, the masses which are moved are higher and the braking distances are longer, due to the system (steel wheel track) than in road transport; routes may possibly no longer be visible by people because of curves, dips or hilltops, i.e. changes in direction of a predetermined path of travel in outline or in longitudinal section. In addition, the speeds which are traveled on high speed routes are so high that a prompt reaction is no longer possible solely due to the speed, the distance traveled in a human reaction time and the braking distances resulting from the speed.

An automatic obstacle detection, to supplement the path clear detection (freedom from, or sufficient distance from, vehicles driving ahead) is also necessary for the following reasons. Storms, which are, in fact, increasing worldwide, can bring obstacles onto the path of the vehicle. Problems can occur at intersections (even at separate levels) of transport routes, flyovers and underpasses etc. An impingement of people and objects onto the path of the vehicle is possible. Mischievous interventions on the path of the vehicle are already known. The risk of terrorist acts is increasing. A monitoring of the entire rail area, which is costly in terms of personnel, could be assisted electronically here.

Finally, the monitoring of wide stretches of very fast and sensitive transport infrastructure (high speed trains, magnetic suspended railways, including the stations and their access points) by personnel, even with camera/screen assistance by means of remote data transmission, is no longer conceivable, because it is too costly in terms of personnel. Even if it were economically viable to provide personnel for this, an object monitoring with image transmission by video without the intelligence behind it for the observers does not make sense, because for months, perhaps years, at particular points no obstacle, no incident, and no planned obstruction, no act of terrorism occurs, the site of the obstacle on the route with a plurality of monitoring points is also not known in advance, so that the permanent observation over a long period of time of unchanging images can lead to boredom and familiarity for the monitoring personnel, but on the other hand, if an incident occurs at one of these many points, a disaster with hundreds of victims can be the result.

The constant scanning of a route by the driver over a lengthy period of time can likewise lead to states of familiarity and inattentiveness, possibly even to a certain trance state (findings from psychology), so that even under the assumption that driving quickly over a route which is easy to survey (even at high speed), at e.g. 350 km/h, is still able to be mastered (solely by human means), a sufficient safety can not be guaranteed.

Recently, intelligent image recognition systems have been developed with artificial intelligence, which detect changes in the image, in particular critical or dangerous changes, automatically, without the intervention of an observer, with a high degree of reliability, and for example can trigger an alarm. They can, however, also trigger any other action provided by an electronic programme, such as for example the reduction in speed or the automatic braking of a rail vehicle.

SUMMARY OF THE INVENTION AND ADVANTAGES

An object of the present invention consists, inter alia, in providing a guidance system by which the detection of people is possible in a way which is precise as regards people and accurate as regards time. A precise count, particularly of passengers in mass transport systems, is to be thereby provided. By determining the locality of people, the system is to be able to react flexibly to various conditions and, for example, to facilitate the work of the rescue services in a disaster. Likewise, objects are to be automatically detectable, particularly when they can affect the operation and safety of the transport system.

The object of the invention further consists in providing a system in which the data for counting, monitoring and observing are preferably evaluated automatically without the intervention of personnel, and the essential operating and security functions of the transport system are controlled automatically for the purpose of increasing operating reliability, personal safety and the efficiency of the operation. A possibility for the intervention of responsible personnel in the control centre is not to be ruled out here; it is preferred, however, that the system runs without the intervention of personnel.

The purpose of the invention is the controlling and monitoring of the transport system, controlling with regard to vehicle use, checking with regard to the controlling of people (from the automatic control of authorization to travel to the prevention of terrorism), provision of safety in a disaster situation (orientation, guiding and finding people by means of a chip card etc.) and checking the route in normal operation and in a disaster situation.

The invention is based on the idea of providing the automatic control of the use of vehicles, dependent upon the number of passengers, likewise camera-assisted monitoring of routes. Also camera-assisted here are the safety monitoring of the building infrastructure, stops, trains etc., combined with existing partial technologies for the detection for example of fires by intelligent image evaluation, but also of criminal behaviour on public means of transport, up to and including dangerous behaviour (e.g. suitcase with explosive etc.). The system also includes the vehicle path security aspect.

The purpose of combining these various functions is, in addition, both the multiple applicability of apparatus and data recovery (e.g. cameras, sensors etc.) and of data delivery apparatus (e.g. passenger information displays, loudspeakers etc.) and also the use of a "backbone" for the information technology infrastructure, which in addition allows a transport system to be operated in a way which saves on personnel, and also offers a variety of possibilities for its security.

The present invention is therefore based on an all-encompassing guidance and security system for transport systems, in particular, complex mass transport systems, in which automatic passenger counting, security monitoring, for example, against fire, crime and terrorism, control of the use of individual elements of the transport system, such as vehicles, trains etc., automatic monitoring of the track and passenger information provided by a "backbone", an electronic backbone are functionally connected with each other. The partial functions of the system which can be completely or partly integrated into the system and put into operation, preferably use data lines in order to keep within limits the costs incurred in large investments in information technology in transport systems. Further elements such as access control to transport means (e.g. biometry), following passenger routes, automatic control of evacuation (for example in the case of fire or disaster) from vehicles, trains, or the building infrastructure, automatic monitoring of the routes, prevention of access by people to operational areas etc. and also all types of passenger information, including advertisements etc. are preferably to be added to the guidance and security system.

The present invention is directed to a control system dependent on passenger numbers and safety parameters, which preferably integrates the functions of passenger guidance and passenger information, but is also able to operate without these functions.

It is therefore an idea of the invention to feed the images and data of high resolution, preferably digital, cameras, particularly video cameras, the data of electronic image processing and intelligent image recognition, with and without human intervention, the detected data of movement and action patterns, of three-dimensionality particularly of parallel positions on a section of the rail or road infrastructure, but also of waterways, landing paths etc., into systems which generate action instructions, where they are combined with the control of automatic or semi-automatic vehicles which assist the driver or driverless vehicles or other means of transport such as magnetic rail vehicles or means of transport which are not connected with the ground, in order to trigger movement operations on these vehicles, which avoid risks during the journeys made by these means of transport, or where they trigger an alarm or avoid other dangers.

In implementing the invention, it is immaterial whether an automatic braking, which is necessary for safety reasons, is triggered by the results of electronic image processing, or the provision or further trains when the system detects that the platforms are overcrowded.

One element of the invention is the securing of the path of the vehicle, both in the platform and station area and also on the track area. This task can take place in the platform area by intelligent processing of digital images (as described below), but also in the track area both by the detection by means of transmitters of people who have entered illegally and also by the processing of digital images of the track, in which the counting described above, or journey initiation can also be used so that journeys are stopped (automatic braking), if obstacles on the path of the vehicle are detected, preferably automatically, or else become detectable through the observation of the track images by personnel in the control centre.

The object of the invention is solved according to one aspect of the invention by a guidance system, particularly in mass transport systems, which can detect the position of people and objects in limited spatial areas by detection units, and which, depending thereon, can control various guidance means such that people are guided in a desired direction and means of transport are guided and controlled. The guidance of people and at least one means of transport is likewise to be understood within the scope of the invention to mean that means of transport which serve for the transportation of people are guided or controlled. The precise monitoring of (streams of) people which is made possible is to be used extensively here in accordance with the invention. The data, once obtained, can be profitably used for further tasks which may occur for the control and guidance of people and means of transport. In addition, safety can be increased by various reaction means in and outside the system.

According to one aspect of the invention, a transport guidance system is provided. The system according to the invention comprises at least one guidance means for at least one means of transport and/or for people, several recording units and a central unit. The central unit here is connected with the recording units and with the guidance means; this may take place by wired or wireless connections. The recording units are intended to determine the number of people who are situated in a particular spatial area at a particular moment in time. Depending on this, the central unit can control the guidance means so that an optimum transport of the detected people is achieved out of particular spatial areas or into particular spatial areas. Means of transport can therefore be controlled so that such a desired optimum transport can be achieved. The system according to the invention therefore makes it possible in a very flexible manner to achieve a better utilization of, for example, stations/platforms, transport systems and vehicles, by a respectively appropriate transport capacity (frequency, train length etc.) being able to be realized. Through this, waiting and stopping times of means of transport are reduced, through the avoidance of congestion the respective access ways are better utilized, etc. Through the detection, which is possible by the invention so as to be precise as regards people, an image of the whereabouts of people at any given moment in time can be recorded, which allows users of the system according to the invention to react much more flexibly to the widest variety of situations which may occur for example in a local transport system. The invention is generally suitable in every case in which a desired, flexible transportation of people is to be achieved in specific areas. The result for the operator are cost advantages and an increased reliability in operation, whilst for the people, i.e. the users, a distinctly improved comfort is achieved, including quicker transport. At the same time, the use of the vehicles is controlled precisely in line with requirements, i.e. only the capacities which are actually required are put into use. If reasons arise which are to stop operations, the system automatically triggers commands to do so; all system reactions which contribute to security are therefore triggered without delay.

It is preferred that the central unit can control the guidance means so that the detected people are distributed optimally in the specific spatial areas and are conveyed on in transport systems efficiently and quickly. This makes it possible, particularly in the case of large events with a great influx of people, but also in the case of disasters such as fires etc., to guide streams of people in a desired manner, in order to avoid congestion in specific areas, to break up an existing crowd on a platform as quickly as possible, etc. In this way, platforms can be cleared more quickly, additional trains which are put on by the system in accordance with the invention can already deal with the next influx of people. If the transport operator uses additional trains on different sections of track, people can be directed systematically to these sections. At fairs and the like, the guidance of any possible crowd of visitors can be better carried out or accomplished. Available spaces, for instance platforms, are thereby better utilized and can therefore be sufficient for greater streams of people than is usual in a "chaotic" distribution. The capacity of available lines can be decisively increased by the system; an expensive new building or an extension (tunnel construction, land use etc.) is avoided, high costs are saved.

It is preferred, in driverless and/or automatic, preferably track-guided transport systems, to use the count data and the calculations therefrom for the management for example of additional trains or to automatically trigger the use of these vehicles. In an analogous manner, with a small influx of passengers, vehicles can be automatically taken out of circulation or added.

It is preferred that the recording units comprise automatic sales machines for travel tickets or entrance tickets, in which the automatic sales machines can determine the position of a person on the basis of the position of the corresponding automatic sales machine on purchasing the travel or entrance ticket. As automatic ticket machines are already part of every integrated public transport system, partly only in stations, but also fitted in vehicles, the opportunity presents itself to use these accordingly. Even if the detection of the position is substantially limited to the time of ticket purchase, this simple embodiment of the invention already provides essential advantages. The detection of position can also take place for example by/at: automatic sales machines, barriers, and by transmitter/receiver devices on escalators and stairs, lifts, in passageways and/or train doors.

It is further preferred that the automatic sales machines are equipped with a device which is able to check biometric features of the person who wishes to travel. The automatic sales machines are preferably to be connected by a data line to a data bank, by which a check is carried out as to whether there is possibly some charge against the person who wishes to travel, which could cause the operator to exclude him from travelling. A further variant may advantageously be that annual, monthly or other timed cards are produced from a central point, which contain biometric data, and/or are these tickets are issued by an automatic sales machine, in which the point issuing the tickets and the automatic sales machine are connected online to a data bank, by which biometric data for example of relevantly known or wanted persons can be matched. The issue of a ticket to such a person, and hence the use of the transport system, can thereby be refused. Biometric features may be fingerprints, iris recognition e.g. via a camera integrated into the screen of the automatic sales machine, but also the geometry of the hand and its lines etc. As the access control to the transport system is preferred, fingerprints appear to be the solution which might preferably be pursued further.

The issued ticket contains both the biometric data e.g. recorded on a chip (preferably) or magnetic strip or programmed in, and also a type of "pad", preferably a micro reading apparatus which scans a biometric feature, advantageously a fingerprint or the structure of a fingertip, and compares it with the programmed-in parameters by means of mathematical parameters, i.e. the ticket equipped by non-contact functions (transponder or suchlike) only clears the authorization to travel at the control point, e.g. access barrier to the metro or train (barrier apparatus) to the person who has the same biometric features, because at the control moment he is touching the card with the same finger as when buying the ticket (see above). Through the separation, described explicitly here again, of searching the data banks and a time-saving 1:1 control at the access point to the means of transport or platform itself, the controlling process can be rectified to such an extent that it represents a high degree of security for the transport system without, at the same time, slowing down the operation.

The following mode of operation is preferred. A person with a ticket requests access to the transport system. The apparatus at the control point carries out a check: Does a mathematical parameter of the biometric data on the chip coincide with a mathematical parameter of the biometry of the user, which is read in? If yes, access is permitted; if no, access is refused.

It is further preferred that the automatic sales machines can determine a validity range or a corresponding destination of a bought ticket and can determine therefrom a likely direction of movement or a likely destination of a ticket purchaser, and the central unit can control the guidance means depending on this movement direction. The automatic ticket machine can easily already determine when issuing the ticket the validity range, for instance 2 stations or specific rings of a system which is divided into rings, and in an advanced variant also the precise destination of a ticket. Conclusions can be drawn from this as to the likely direction in which the respective ticket purchases will move. If, for example, a large number of tickets to a particular destination or with a particular range are bought in a particular period of time, the transport operator can put on additional trains, in order to avoid a possible impending congestion. For an estimate, a validity range together with the known position of the respective automatic sales machine is sufficient.

According to the invention, the system can preferably make the decision automatically, or can prepare instructions accordingly to the dispatching personnel. A passenger who acquires at a machine in Ring 1 a ticket with a range up to Ring 3 will probably also wish to travel into the area of Ring 3. This information can be used efficiently to detect expected demands on a transport system. The collecting of information on proposed travel and the evaluation resulting therefrom as regards the demand is already prior art (U.S. Pat. No. 4,092, 718), the automatic issue of travel commands in connection with count data or a complex calculation model, which combines incoming vehicles with regard to their changeover traffic, such as buses which deliver passengers to metro stops and other sources, is preferred according to the invention and is offered as a solution to the automatic management of tickets dependent on demand.

The system according to the invention also controls the use of additional trains through automatic or driverless systems, particularly by recommendation to dispatchers or automatic issuing of travel commands for additional trains and automatic inclusion thereof into the transport system/transport network. The combination serves to achieve an optimum target in line with the purpose of the present transport guidance and security system according to the invention. This is the optimum utilization of the built and available infrastructure under the aspect of maximizing efficiency with the available structural means and the available vehicle fleet, because guidance electronics in every case is more favourably priced for a transport system than new building or the acquisition of additional vehicles.

It is preferred that the recording units comprise access control arrangements, and that the access control arrangements are able to determine the position of a person on the basis of the position of an access control device which has been passed through. Such access control arrangements are already frequently present in stations and suchlike, or can be additionally fitted simply and at a favourable cost, for instance light barriers, swing gates, electrically operated doors and suchlike. From the position of a corresponding access control arrangement, the position of the corresponding person can be determined at the moment of passing through. It is particularly preferred here to design the system beyond the usual status of access barriers such that access is refused for security reasons to a person who is not desired to use the transport system.

Furthermore, it is preferred, as soon as the limit of a capacity increase and reduction in travel time is reached through passenger guidance, to automatically initiate with the same data basis and the same calculation programme the provision of further vehicles, preferably track-guided or rail vehicles, which can be brought into use and operation without further intervention of personnel, when the infrastructure permits automatic, driverless operation.

It is preferred that the access control arrangements can additionally determine the direction of passage through the corresponding access control device, and the central unit can control the guidance means depending upon this passage direction. This information is very useful, because it is important to detect whether people are entering or leaving a station. This can be achieved by access control arrangements with a "one-way function", for instance swing gates which can only be passed through in one direction, or by double light barriers or suchlike. Valuable data for the controlling of the guidance means can be obtained from the direction information which is determined hereby.

It is preferred that the recording units comprise image recording devices, in which the image recording devices are able to determine the position and/or speed of a person or of an object carried by a person within the recording area of the respective image recording devices, and the central unit can control the guidance means depending upon this position or speed. It can thus be determined through computer-controlled image processing which is already known (object recognition, face recognition), how the people and carried objects are moving.

As video monitoring is already frequently used, it is very advantageous to also use this for counting within the framework of the invention. In so doing, it can preferably be followed in the background whether people who were carrying objects on entering the metro station continue to carry these with them, otherwise an alarm is triggered immediately by means of intelligent background software and further measures can be initiated (e.g. evacuation). The image recording devices are preferably also combined with recognition systems which make it possible to recognize a person again or to filter out a wanted person from the stream of people.

It is further preferred that the recording units comprise several personal transmitters, which are each intended to be carried by a person, each transmitter being able to transmit an identification signal, and several receiver arrangements to receive the identification signals from the transmitters, and that the receiver arrangements can determine the position of a person on the basis of receiving identification signals. This makes possible a non-contact detection of the position of people, which goes beyond the variants mentioned above with regard to (local and particularly chronological) accuracy. In principle, the position can be determined at any moment in time, not only when passing through a barrier or when purchasing a ticket. Through this, an even more precise reaction is achieved to changes in the conditions in a transport system or suchlike.

It is preferred that the transmitters are integrated in a travelor entrance ticket. As such cards have to be acquired by passengers or visitors, the integration into these cards of course preferably presents itself.

It is preferred that the card has biometric data of a bearer. Both cards which are linked to a person and also cards which a not linked to a person can contain a so-called "pad" or field, on which biometric information is stored when they are purchased, preferably a fingerprint, for instance when a ticket is removed from an automatic machine. On passing through a control barrier, or whenever required, the stored biometric information must be identical to that of the bearer of the card as on purchase/when received. This is particularly advantageous if a further monitoring of the identity of the traveler is to be carried out between the purchase of the authorization to use the means of transport, and boarding the means of transport itself, e.g. at a train door or station gate, and also during the boarding process of a land-based or non-land-based means of transport. The combination with the checking of biometric features which is possible in the ticket is already described above (quick access control for metro systems) and is preferred. It is illustrated separately in graphic form in FIG. 8.

It is preferred that the receiver arrangements determine the direction of movement of a person on the basis of a change in the position of a transmitter, and the central unit can control the guidance means depending on the direction of movement. The advantages of determining the direction of movement have already been discussed, however the detection by means of the transmitters makes a substantially more precise detection possible than in the variants described above.

It is preferred that the receiver arrangements can determine, on the basis of a change in the position of a transmitter, the speed of a person in relation to one or more receiver arrangements, and the central unit can control the guidance means depending upon the speed. The determining of the speed, together with the known direction, makes possible the detection of particular situations and an early engagement of the system. If, for example, it is detected that a large number of people are entering a station and are quickly moving towards a particular platform, then lifts, escalators etc. can be switched in such a way that crowding is as far as possible avoided. Furthermore, by means of the speed, one can determine when the people will reach the platform, for instance, so that a provision of additional trains etc. can take place as promptly as possible. This takes place automatically in accordance with the invention. The software necessary for this is to be adapted respectively to the corresponding built infrastructure. According to the invention, it is preferred to follow the described principle.

The provision of the additional trains preferably takes place automatically. The data obtained from the system according to the invention are transferred into the control arrangement of the transport system, where they trigger recommendations to issue driving commands to drivers or to an automatic and driverless system, to the control personnel or preferably issue automatically and independently corresponding driving commands to driverless trains. Also, through the linking of escalators, lifts etc., it can be presumed that data material is obtained during multiple useability, which generates information for the automatic train control and for the maintenance of the lift installations, escalators, rolling walkways and other arrangements, and passes this on to the corresponding data processing installations (e.g. to trigger a repair command, inter alia).

Therefore, for example, the maintenance of escalators (which do not run continuously) and suchlike can therefore be planned precisely after a specific running time or operating time, instead of fixed time intervals, which may possibly not match the use which has taken place. Thereby, a considerable contribution is made to improving the costly "facility management" in transport systems in favour of the operators, and operators save on costs, which also contribute to the amortization of the system as a whole.

It is preferred that the identification of the personal transmitter has a clear identification of a person. This principally concerns travel tickets, such as for instance non-transferable monthly or annual season tickets. With a control by station personnel, for instance the authorization of a bearer of the corresponding ticket can then be checked. The identification can be provided according to the present data protection regulations or other guidelines of the operator, for instance so that only corresponding sites can determine the user of the card from the identification (customer number at the transport operator, or similar). The personalized authority to travel also helps in decreasing crime, lack of security, vandalism etc. in public transport systems—problems which will have a very positive effect on the prestige of the transport system and on subjective feelings of safety.

It is preferred that the identification of the personal transmitter has validity information, in which the validity information indicates a permitted timespan, a permitted spatial area or a travel range or route. This will be especially useful in order to mark on the card for example the month in which the ticket is valid, together for instance with the area in which journeys are permitted. In this way, it can be determined in a non-contact manner, what validity a card has which is detected by the system. The transmission of the information can be brought about by technologies such as transponders etc., which are prior art (mentioned inter alia in DE 20202616).

It is preferred that on the basis of the validity information, the central unit controls the guidance means so that people are guided away from a spatial area which is not permitted, or are kept away therefrom. This is especially useful for a kind of access control, i.e. for instance the blocking off of a stadium area after the maximum scheduled number of visitors have entered the area. From this moment in time, it can then be indicated by the guidance means for instance that this area is full, and the visitors are then diverted into other areas which are still vacant.

It is further preferred that control commands are generated for light installations or display boards of all kinds, such as the automatic generation of loudspeaker announcements or notification to personnel who are to make announcements in a conventional, manual manner. It is particularly preferred that the above-mentioned characteristics contribute to securing the public space and transport systems from terrorist attacks.

It is preferred that the receiver arrangements can detect an exceeding of the timespan, the travel range or route or the entry into a prohibited spatial area, and the central unit can issue a notification that this exceeding has taken place. This makes it possible to detect people travelling without a valid ticket in a rail vehicle, but also people who possibly in error or deliberately have entered a blocked off area. The operator of the system can then react to this in a suitable manner. It is further preferred that the guidance system according to the invention triggers an alarm and/or initiates measures automatically.

It is preferred that the central unit can determine a movement pattern of people from the position, speed and/or direction of movement, and on the basis of this movement pattern can control the guidance means or issue a notification concerning the occurrence of a particular movement pattern. Unusual movement patterns, or those which are recognized as being problematic, can be detected early and can be reacted to by means of the control arrangement or an alarm can be triggered. If, for example, a large number of people is not moving or is only moving slowly towards an incoming train, but one single person is moving very quickly towards the train, this could for instance suggest a suicide attempt, and a braking of the train could be brought about via the control arrangement. If, on the other hand, for instance a person is carrying a suitcase, but then the suitcase is left standing whilst the person moves away, this can suggest the depositing of a bomb. An evacuation of the area can be brought about, likewise for instance the automatic running of the respective recordings of a video monitoring installation, for control by the personnel.

According to the invention, it is preferred that for example the system controls a train, occupied by passengers, if necessary automatically, so that it no longer travels into a station in which a suitcase has been found on its own by the video system, or where other reasons for alarm exist. On the other hand, it can be preferred to allow an empty train to travel in for the rapid evacuation of people via the platform, if the above-mentioned suitcase or another cause for alarm has been found locally for example in the region of the access ways to the platform or to the region which is to be evacuated. In so far as it is possible for instance to equip items of luggage with transmitters in a similar manner to the tickets in accordance with the invention, for instance in the freight hangers in aircraft, items of luggage can be followed in an entirely similar manner to the people.

It is preferred that the guidance means comprise visual guidance means, acoustic guidance means, blocking- or opening means, escalators, conveyor belts, lifts or control means for vehicles, particularly rail vehicles. Visual guidance means may for instance be variable illuminated signs, signal lights and suchlike. This also includes traffic lights both for vehicles and for people. Acoustic guidance means will generally be loudspeakers and similar. Also included are loudspeaker installations with automatic announcements which are recorded on passenger information computers or elsewhere. Blocking- and opening means are to be understood to mean for instance controllable barriers, e.g swing gates for people These, and the other means mentioned, can be controlled by the system according to the invention in an advantageous manner in order to achieve the described advantages. A proportion of these means is already present in every transport system and, in so far as they are able to be controlled by the central unit, can be used within the framework of the system according to the invention.

Rail vehicles are of course preferred, because they are the easiest to be able to be guided in a desired direction, for instance by the placing of switch points. The system can be included in the controlling of automatic train systems; it can be designed so that it engages into the train control arrangement or transport means control arrangement, particularly "dispatching", i.e. the controlling of the train and transport means use. Included in this are the train use with regard to length of the trains and size of the transport means units, the frequency, the lines and directions traveled and the destinations of the trains. It can serve to control the acceleration or deceleration of the transport means. "Trains" are to be understood to mean overground or underground rail vehicles such as underground trains or trams, but the invention can equally be used in connection with buses and other vehicles. It can also serve to facilitate the guidance of people and to improve security e.g. in airports.

The transport guidance system is preferably constructed so that a data communication takes place with the control arrangement of the transport means, so that, as required, transport means units can be added per unit of time or can be taken out of the system. In addition, it is preferred that the transport guidance system can carry out this increase or reduction automatically (without the intervention of personnel) with the automatic controlling of the transport means.

According to a further aspect, a guidance and security system is provided for complex transport systems, which have sections of route with transport pathways, means of transport travelling thereon and access arrangements thereto. The guidance and security system comprises
- monitoring means for the sections of route;
- monitoring means for the means of transport;
- a control unit, connected with the monitoring means, which processes the data originating from the monitoring means with regard to the currently existing transportation requirement and all events relevant to safety in the means of transport, on transport routes and access arrangements, and controls the means of transport accordingly; and
- issuing means as an interface with control personnel and/or as an interface with passengers, for the issuing of instructions for assistance in the operation of the means of transport or in an emergency.

Access arrangements to the means of transport or transport systems include for example stations, but also access ways, staircases, lifts and suchlike.

The issuing means are provided as an interface with control personnel (if desired by the operator) and/or as an interface with passengers, in so far as their assistance is necessary to optimize the operation of the means of transport or in an emergency (e.g. instructions for personal rescue).

According to a further aspect, a system is provided for the automatic operation of means of transport and transport systems, particularly railway transport means, in which optionally all the parameters affecting the operation and its security, such as numbers of passengers, persons or objects having potential danger are automatically detected with regard to their positioning in the transport system and the access ways thereto, and the detections of these are automatically entered into the control arrangement of the transport system.

The transport systems are preferably open systems and/or have mixed traffic. Closed transport systems are, for instance, metros, cableways or magnetic trains, with a defined number of transport means on a track which is inaccessible to other transport means. Open systems or systems with mixed traffic (such as for instance jointly used roads for trams and cars/lorries) on the other hand also have transport pathways which are accessible to various means of transport (also individual traffic), and in which no defined number of means of transport travels on the transport pathways. Therefore, this embodiment can also be used in open systems and/or those with mixed traffic, to increase operating efficiency and security.

Preferably in addition means are provided for detecting obstacles from the transport means and from locations outside the transport pathways (e.g. from along the track up to a satellite), to extend the surveying boundaries connected with the location of the vehicle, and to detect in three-dimensional space, in which the means for detecting obstacles are functionally connected, generating control commands, with the operation control arrangement of the transport system. With this embodiment, the limits of human observation can be extended in connection with the controlling of means of transport, i.e. obstacles can be detected before a driver of a vehicle can normally detect them, or even if they are basically not visible to the vehicle driver (behind bends etc.).

THE DRAWINGS

Further advantages, features and possibilities for application of the invention will be apparent from the following description of example embodiments in connection with the drawings.

FIG. 6 shows diagrammatically an embodiment of the system according to the invention.

FIG. 8 illustrates an embodiment of a ticket according to the invention.

FIG. 9 shows a usage situation of the system of the invention.

FIG. 12 shows a preferred further embodiment.

FIG. 13 shows a preferred further embodiment.

DETAILED DESCRIPTION

The features and advantages which have already been discussed, and also further features and advantages of the invention are explained below with the aid of applications which are given as non-restrictive examples.

Figure 1:
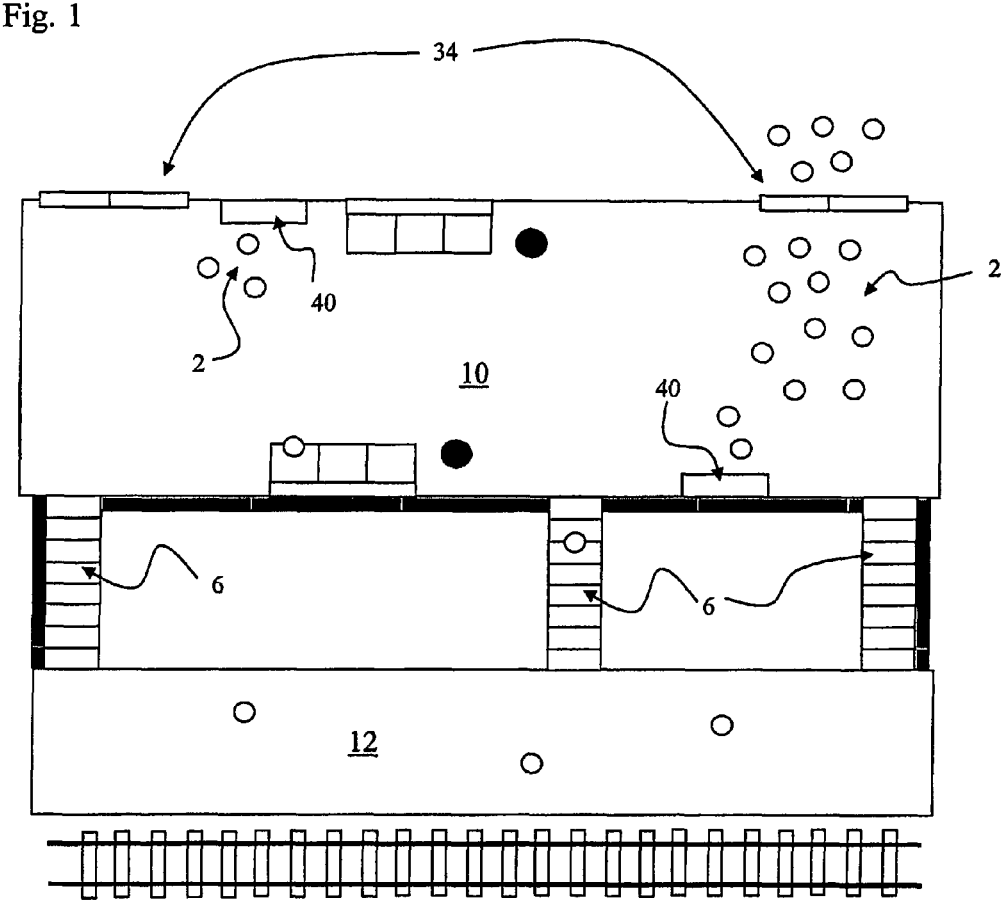
FIG. 1 shows a diagrammatic illustration of a first embodiment of the system according to the invention.

A simple embodiment of the invention is shown in FIG. 1. The station has a waiting area 10, i.e. for instance an entrance hall, and a platform 12. From the outside, doors 34 lead from the right and left into the station. Passengers are represented as circles 2. Three escalators 6 lead from the entrance hall 10 onto the platform 12. Several automatic ticket machines 40 are arranged in the station. Automatic ticket machines 40 can of course likewise be arranged in a vehicle, i.e. an underground train or suchlike (not shown). When a passenger acquires a ticket at an automatic machine, the guidance system according to the invention can detect that a person is situated in the region of this automatic machine. Furthermore, on the basis of information concerning the ticket which the automatic machine delivers, it can detect where the passenger wishes to travel. This can take place with varying accuracy, depending on the information from the ticket. In a simple case, this would be for example a journey range, for instance 3 rings, 4 stations, or an area (tariff zone). In a further variant, the ticket could be more specific, i.e. it could indicate the destination explicitly. From these destination data, the system can conclude that the passenger would probably wish to travel to a location which is more or less precisely known, depending on the nature of the destination data. The prior art U.S. Pat. No. 4,092,718 carries this out partially for non-track-guided vehicles, in which the generated instructions are passed there to the drivers of the vehicles, but can not trigger or control any automatic driverless journeys. From the information concerning a number of passengers, a picture then results of the number of people who are waiting in particular areas and would probably wish to travel into other areas. The system makes it possible for the transport operator to react appropriately to altered conditions, for example to put on additional trains if a large number of people acquire tickets for a particular destination at the same time, i.e. in the case of a large event, in the rush hour traffic or if other transport systems in the network have broken down, for instance the failure of particular sections of route, so that the passengers take an alternative route. This preferably takes place fully automatically in accordance with the invention.

Figure 2:
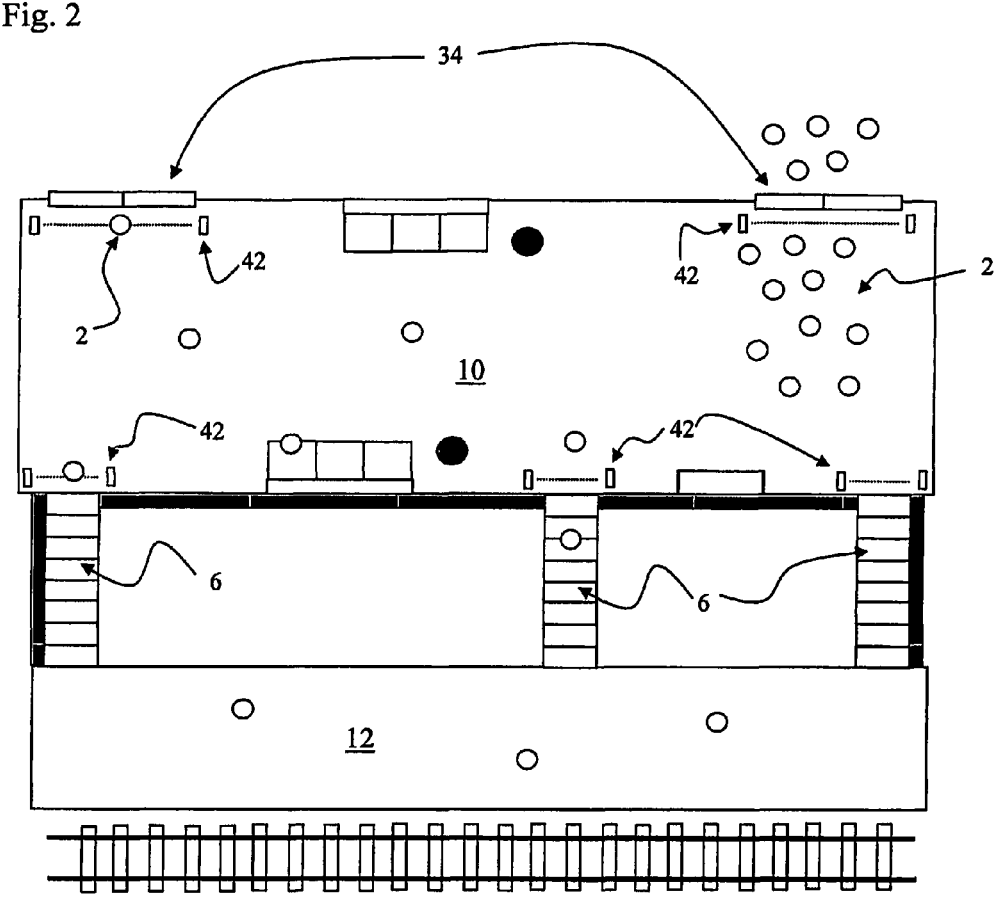
FIG. 2 shows a diagrammatic illustration of a second embodiment of the system according to the invention.

Another embodiment of the invention is shown in FIG. 2. A station, as in FIG. 2, is equipped here with access controls 42, which can detect and count people on entry and exit into and from particular areas (entrance hall, platform). The access control arrangements 42 are preferably arranged here in the region of doors, escalator access points etc. This can be achieved for example by light barriers, but also by other devices, for instance by illuminated plates which are covered by people are they pass over them, so that light sensors in the ceiling measure the obscuring and can conclude therefrom the number of people.

In addition, in an equal way, infrared sensors, motion indicators, light barriers, counting sensors, a computer-controlled video image evaluation by monitoring cameras or extra cameras installed for this (video image abstraction etc.) can be used to obtain this information. The direction, i.e. whether a person is entering or leaving the station, can be obtained by suitable embodiments of the access controls (double light barriers, barriers which are only passable in one direction, and suchlike). Detection which is precise as regards people can be achieved by suitable devices for instance using personalized tickets with RFID chips. It is to be noted there that, according to the invention, access controls can likewise contain such devices, which do not serve primarily for access control, for example devices which are intended to detect a transition of people between various sections of the same platform, in addition to devices which detect entry to the station. For the sake of simplicity, such devices are combined under term "access controls". Such devices, for instance light barriers, can be favourably acquired and installed; the location where they are set up can be selected very flexibly, and streams of passengers are thereby in no way impeded.

The automatic evaluation (by image processing, abstraction etc.) of video images is also preferably to be utilized for obtaining data. With increased monitoring and the necessary for the latter, cameras and data lines are in any case present in transport arrangements. Both the infrastructure, i.e. the buildings for the filling and emptying of the means of transport, and also the means of transport themselves, can have monitoring arrangements which are, at the same time, counting arrangements and arrangements for detecting danger, in which the prompt (online) transmission via radio interfaces, infrared interfaces, wireless LAN or similar transmission technologies are a component of the system which is illustrated here. Another possibility for access control arrangements which, however, constitute a greater or lesser hindrance to large streams of people, would be devices or doors similar to barriers, which only open after the introduction of a valid ticket for the passenger. On the other hand, such blocking/opening devices present a possibility for more precise control for the transport operator (closing off stations after close of business etc.). For the sake of completeness, it is to be noted that particular smartcard systems and non-contact or "touchless" systems are prior art, which can possibly also detect the direction of movement of the owner of the card. Furthermore, through several sensors in the area, i.e. through the geometric arrangement of receivers and the movement of the respective transmitter in relation thereto, a detection can be produced of the direction of movement and the generation of a corresponding data impulse, which passes this direction on to the control arrangement of the system. In addition, it is to be noted that the system, preferably deviating from the prior art, particularly for example U.S. Pat. No. 4,092,718, collects its data necessary for the functions according to the invention independently of the intervention of the passengers themselves, in order to be able to function, but additionally uses inputs from passengers in automatic machines, in so far as they are known in the prior art, if they are useful for the function or can refine the results of the function.

Figure 3:
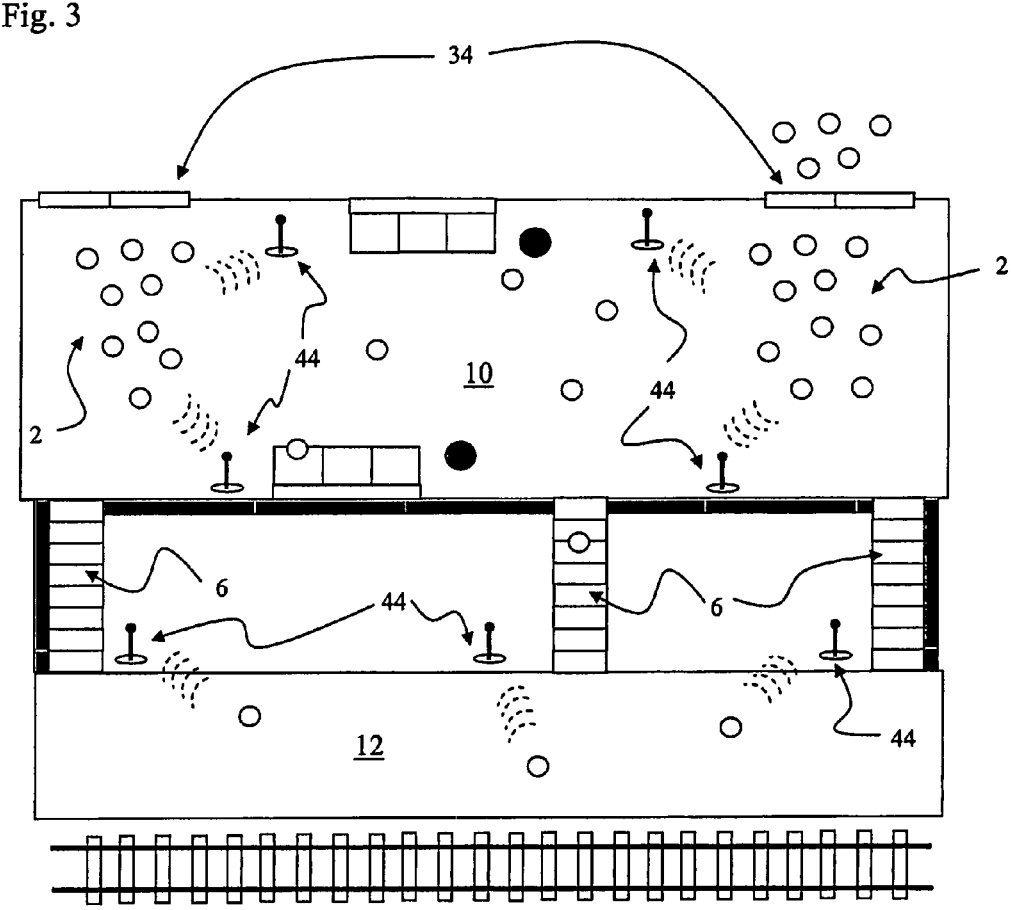
FIG. 3 shows a diagrammatic illustration of a third embodiment of the system according to the invention.

A particularly preferred embodiment of the system according to the invention in a station is shown in FIG. 3. The station has a waiting area 10, i.e. for instance an entrance hall, and also the platform 12. From the outside, doors 34 lead from the right and left into the station. Passengers are represented as circles 2. Three escalators 6 lead from the entrance hall 10 onto the platform. Several receiver arrangements 44 are arranged distributed in the station, in order to receive the signals from the transmitters (not shown) which are carried by the passengers 2. Receiver arrangements 44 can of course likewise be arranged in a vehicle, i.e. an underground train or suchlike (not shown). The (limited) reception areas of the receiver arrangements 44, which can overlap to a greater or lesser extent, form a kind of cell system comparable to the mobile radio systems. By techniques which are known from the same field, the position of a personal transmitter of a passenger can therefore be determined more or less accurately according to requirements (stay in one cell or determining the position by measuring the strength of reception of the signal in several cells). In the example shown here, a large number of people 2 is entering the station, illustrated on the right-hand side. The system will detect this large number and also their direction of movement, will conclude therefrom that the people wish to enter the platform, and will take measures so that the passengers do not all arrive in the right-hand region of the platform.

To do this, the right-hand escalator 6 can be switched off or at least greatly decelerated or even made to move in the opposite direction, whilst the central escalator is moved at maximum speed. This prevents several or even all passengers from arriving at the platform 12 via the right-hand escalator and possibly overcrowding this area. A better distribution of the people on the platform is thereby achieved. If, in the case shown, a fully occupied train travels in at the same time, the further problem arises of separating the disembarking passengers are much as possible from those who wish to board the train, in order to avoid crowding and hence a loss of time. If the system therefore detects, as here, that a large number of people are streaming onto the platform on the right-hand side, then the left-hand escalator 6 can be moved in a direction from the platform 12 towards the entrance hall 10, and the disembarking passengers can be guided towards the left-hand exit of the station by visual and/or acoustic guidance means (not shown here; see FIGS. 4 and 5). Thereby, a collision between disembarking and boarding passengers can be efficiently prevented, the train can move off again more quickly and a larger number of people are conveyed in the same period of time.

Figure 4:
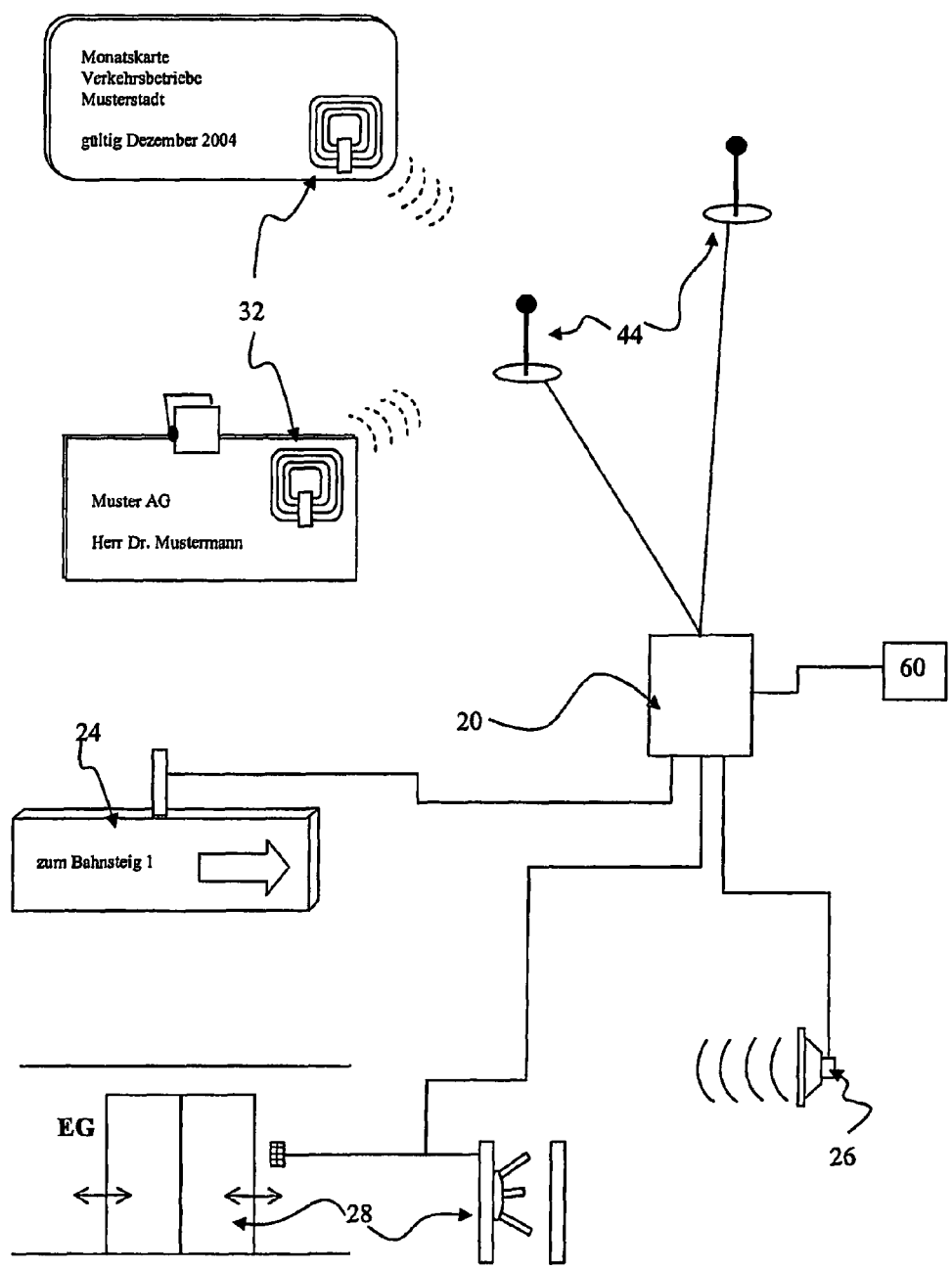
FIG. 4 shows diagrammatically the most preferred embodiment of the system according to the invention.

In FIG. 4 a further embodiment of the invention is shown diagrammatically. The system comprises several transmitters 32, integrated here in two different objects (ticket and name badge), several receiver arrangements 44, and a central unit 20. The central unit 20 is connected with the receiver arrangements 44. Various guidance elements can be connected to the central unit 20; in the example shown here, these are visual display means, i.e. for instance an illuminated panel 24 with controllable display, acoustic guidance means 26, for instance an announcement loudspeaker, and mechanical blocking and opening elements 28, e.g. electrically controlled passage- or lift doors or a lockable passage barrier, and in particular control means 60 for means of transport, i.e. for example the controllable switch points and/or signal arrangements of an underground railway system. The transmitters 32 may be RFID chips. It is to be noted here that the receiver arrangements 44 usually also have the capability to transmit, in order to activate the generally passive RFID chips, so that these emit their corresponding identification signal. The connection of the central unit 20 with the receiver arrangements 44 and guidance means 24, 26, 28 may be both wired or else wireless. The corresponding vehicle capacities are delivered according to the invention via the central computer in the required length, spatial capacity and journey frequency.

The system which is shown offers a variety of possibilities for guiding and directing people or streams of people. It is described below for a railway or underground railway system, but many other additional applications come into consideration, such as other mass transport means, leisure parks, underground garages etc. Thus, for example, on the day of a large event, the system can be controlled such that the passengers are preferably directed to the site of the event. The passengers can be directed onto the shortest routes to this site by means of illuminated signs and loudspeaker announcements. They can also be guided in a station to the trains which are transporting the crowds to or from an event. This is particularly advantageous in complex intersection stations of several underground train lines on various levels, as are to be found for example in London, Paris, Moscow, Tokyo or Munich. An optimum, i.e. uniform as possible, occupation of the trains can be achieved by the system.

To do this, it is detected whether more people are situated in one boarding or train area, but fewer in another. Then, with the aid of this information, the system is controlled so that access points to the areas which are already full or overcrowded are preferably closed off, whilst the people are guided towards the areas which are still empty. In addition, this is linked to the automatic provision of train capacities. By the design of the system according to the invention, an efficient breakdown management of mass transport systems is possible. In the case of a breakdown, for instance because of a line or a station which have been closed due to an alarm, passengers are diverted efficiently to other lines, the capacity of which is automatically increased, or diverted automatically to an alternative route, and optionally efficiently distributed and guided thereto. This can take place by visual displays, by acoustic instructions, or the respective access ways can be blocked off or at least made less readily passable. If, for example, a station has access points via 3 escalators, front, middle and rear, then the escalators can be controlled such that a desired stream of people or a distribution of passengers is achieved. In the case where the front platform area is already overcrowded, the system will recognize this and, for example, will switch off the escalator leading to this area or will run it in the opposite direction. Thereby, the passengers are made to use the two other escalators, and a further overcrowding of the front platform area is efficiently prevented. The same applies to lifts, automatic doors and suchlike, which can be selectively closed off or opened.

In the case of escalators, lifts or conveyor belts, both the direction can be reversed, in order to prevent too many people from using the belt in an undesired direction, and also the speed of these devices can be adapted. If an area is to be cleared quickly, for example because a fully occupied train has arrived, or an evacuation is to take place, the transport means can be accelerated. If, on the other hand, an already existing crowding of an area is to be further increased, the transport means can be decelerated, so that the people are given time to disperse more evenly. In addition, according to the invention, the entire capacity management of a complex transport system is carried out automatically or those responsible for this are assisted efficiently and in a time-saving manner (see also FIGS. 6 and 10).

Figure 5:
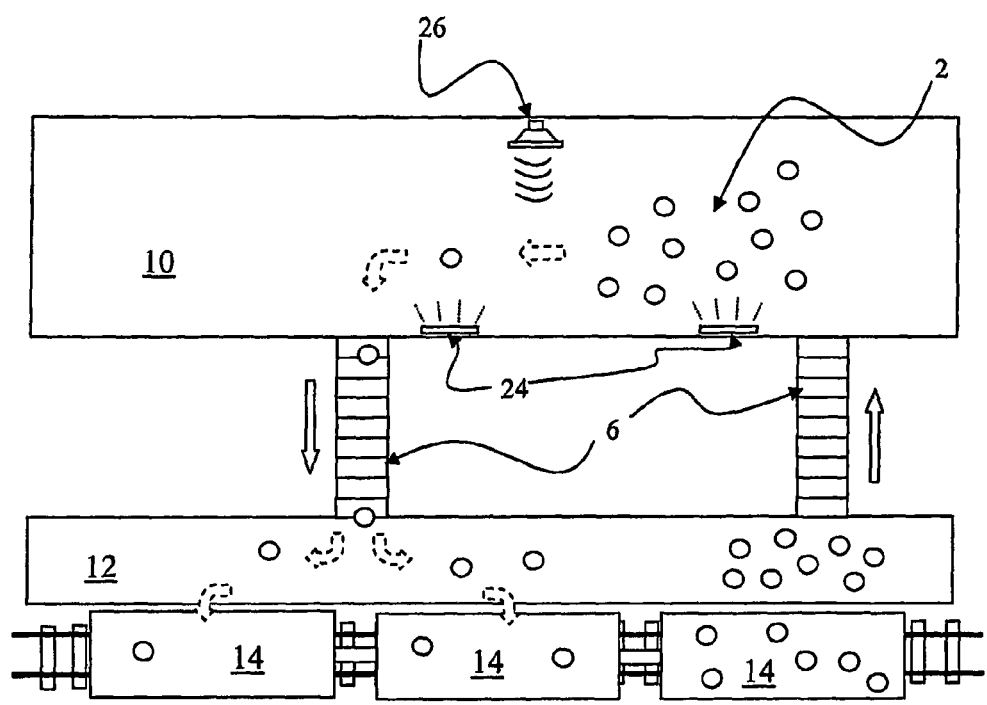
FIG. 5 shows diagrammatically a typical application of the system according to the invention.

In FIG. 5 a situation is illustrated in which the system according to the invention can help to achieve a uniform distribution of passengers on a platform 12 and in a train 14. As can be seen here, the train 14 is already well occupied in the first carriage, and in addition a large number of passengers 2 are ready to board in this area. The system of the invention now detects this situation and switches the escalator, which leads to the overcrowded area, in the direction running to the station area 10, i.e. away from the platform 12. The people who are walking in the platform area 10 towards the train and would normally simply use the nearest escalator, are therefore guided in this way to use the other escalator which leads to the platform 12. The desired direction of movement of the passengers is indicated by dashed arrows. Of course, the desired effect is not only brought about by the running direction of the escalators; according to the invention, the passengers are to be further directed into the desired direction by visual and acoustic guidance means 24, 26, i.e. especially for instance by variably controllable illuminated signs or display panels, but optionally likewise by corresponding automatic loudspeaker announcements.

In this way, visually impaired people can also be taken into account, e.g. these people can be shown the way in a particular direction in an analogous manner to the traffic lights which are equipped with acoustic signal emitters. The entry to an escalator can for instance be equipped therewith, in order to prevent a visually impaired person from stepping in error onto an escalator which is moving in the wrong direction. In the most preferred embodiment, such a person can be provided with a corresponding identification signal on his personally linked ticket, so that the system detects if the person is approaching an escalator running in the wrong direction, etc.

FIG. 6 illustrates in an overall scheme a preferred embodiment of the system according to the invention. In this figure, a combination is shown of various individual components which have already been described. FIG. 6 shows how a variety of individual measures can be combined into an overall system, in order to use the data obtained from the count 110 together with additional information, for instance from the video monitoring 54/computer/controlled image processing 56 for the monitoring 118, guidance 112, 114 of people and control 106, 76, 78 of means of transport 14 by a central unit 20. The control takes place via the central unit 20, by means of a control means 60. The control here can be a doubling (adding additional carriages), uncoupling or change to the line (setting switch points etc.), 76, or the vehicles can be controlled, i.e. particularly reduce or increase speed and suchlike, depending on the embodiment of the vehicle, and even automatic driving including steering. Reference number 112 stands for sectoral guidance commands (to the passengers) in the station, whilst 114 represents sectoral guidance commands within the vehicles. Such sectoral guidance commands can be given by means of automatic loudspeaker announcements, images, controlled coloured floors, ceilings, walls etc., through the use of light (curtains), train destination indicators and other displays. On the basis of the incoming data, the central unit 20 also controls escalators, moving belts and lifts 102, and also for instance platform gates, 104. The dashed lines represent the functions relating to security, which can trigger an alarm in problematic situations, 116, and which also utilize the technical infrastructure of the guidance functions. Images and recordings of the video monitoring are passed to the dispatching centre or to a central guidance point, 108. A monitoring 118 can then take place automatically, but also by personnel. The count 110 takes place in this diagram at the entry areas by means of access control devices 42, also in vehicles 14, for instance by video monitoring 54, but preferably likewise by the travelling of the transmitters in the tickets 58 through the system, b), or on purchase of a ticket 58 at an automatic machine, a). Through constant feedback 100, the effect of a measure taken in the system is constantly monitored. It is not shown here that of course a possibility for the intervention by personnel into the system, i.e. especially the central unit 20, can be maintained.

Figure 7A:
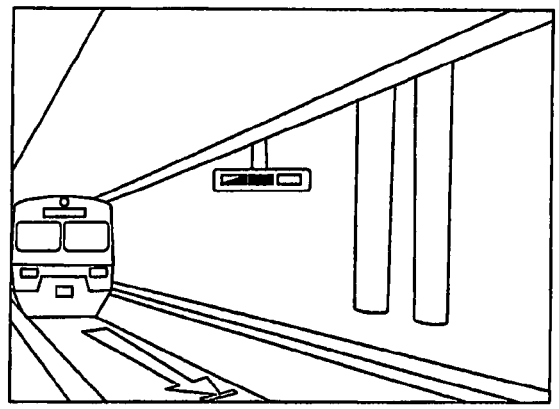
FIGS. 7a, 7b and 7c show three variants of a guidance of passengers on a platform, according to the invention.
Figure 7B:
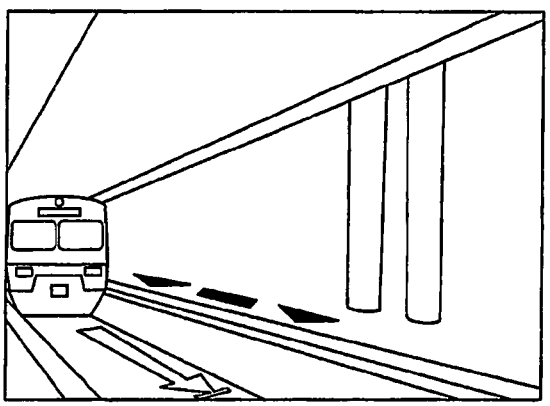
Figure 7C:
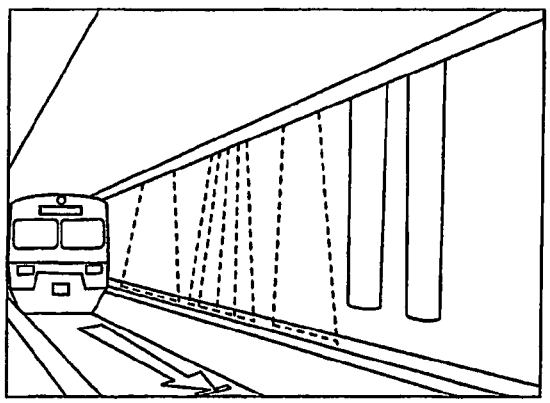

In FIGS. 7a, 7b and 7c three variants are shown for the guidance of people on a platform. Here, the guidance of people is specifically shown, in order to achieve an optimum occupancy of vehicles. On the basis of the data obtained according to the invention regarding densities of people in particular areas, the people are to be guided so that they preferably move into less highly occupied parts of the vehicle. In FIG. 7a this is achieved by corresponding displays, for instance illuminated signs, or displays using various technologies, e.g. LED, LCD, TFT, plasma, inter alia. FIG. 7a shows illuminated fields provided for this in the floor, either by shape (arrow/bar) or by differently coloured fields (for instance red/green). FIG. 7c shows the use of light curtains for this purpose, for instance through differently coloured light curtains or the systematic switching on and off of individual segments. The light curtains may occur linearly on the edge of the platform or may also illuminate a particular area of the platform from above or from obliquely above.

FIG. 8 shows how a ticket for the system according to the invention can be equipped with a magnetic strip 50 and with a "pad" 52. The pad 52 serves to receive a fingerprint of the purchaser of the card, so that these biometric data can be checked later, i.e. whether the bearer is also the original purchaser of the card. This can take place for instance in that when handling the ticket, the purchaser is made to rest his thumb in the "pad" 52. The magnetic strip 50 can serve to record various data; it is of a conventional type and therefore does not have to be described in further detail. The function according to the invention of 1:1 match in the card and the access authorization given thereby, i.e. e.g. unlocking of a barrier or person-isolating installation can also take place in a non-contact manner, e.g. by transponder technology, radio etc. The prior art can be used here. It is conceivable that the respective control apparatus at the access barrier also emits so much energy or so many impulses that the card is activated with its functions and works successfully without its own energy supply.

FIG. 9 shows a typical situation for the use of the system according to the invention for guiding the passengers on a platform, in order to achieve an optimum occupancy of vehicles and reduced stopping times. In this example, acoustic means are indicated, but it could also be visual means or a combination of both means.

Figure 10:
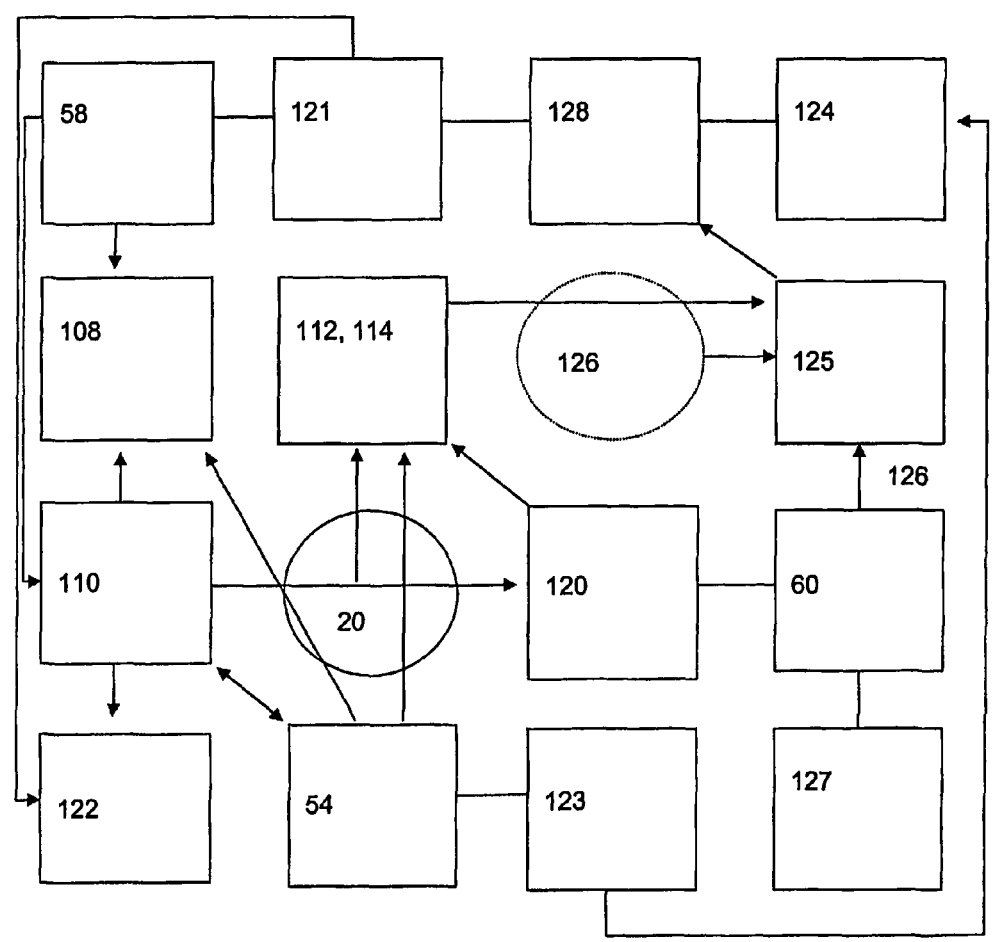
FIG. 10 shows a further embodiment of the invention.

In FIG. 10 an aspect of the system according to the invention is illustrated.

Here, the results of the automatic passenger count 110 are processed as an essential element in the computer unit 20, in order to be coupled via the dispatcher function 120, dependent on the influx of traffic, to the system control automatic travel 60 (included in the description of the further figures as "guidance means"), and in order to trigger commands, or guidance commands, to the automatic system- and train control arrangement.

The core system in the series 110, 20, 120, 60 becomes more efficient through combined partial systems (this can also include the person guidance system according to EP 941527 B1), even if it is able to function without this. Through dependent monitoring systems 54 and 108, the security of the transport system can be drastically increased, which is preferred particularly in view of the threats to public mass transport systems. The aspect of automatic monitoring of stations and trains is new in the sense of the invention (inter alia by means of known electronic recognition systems of intelligent processing of digital camera images), and the combination of these recognition instruments with train control is also preferred.

Various means can be used for automatic counting, such as light barriers, weight comparison, radar- and infrared measurement, and also video images (B4 54), which are processed to count data by a programme connected in the background. However, these images also serve to increase security and to prevent criminal acts in the transport system (108). In connection with the combination of functions described above, the versatility according to the invention of the IT infrastructure (data line and terminal apparatus) is also utilized.

Count data can also be used for calculation, both as distance-dependent calculation in connection with biometric card systems 58 with suitable issue terminal 121 with respect to passengers, and also amongst the operators of the transport means themselves, if several companies offer or operate the service of the transport system—economically independently of each other—(calculation software for distribution of fare income 122).

Video images can be recorded for prosecution, implementing the law and for study purposes (recording media for prosecution and for subsequent planning 123)—cancellation after a certain period of time can be indicated by law (124). Cards and biometry can likewise increase security or totally prohibit access for specific people (e.g. suspects in a terrorist environment) (121 in combination with 58).

Passenger guidance systems according to EP 0 941 527 B1 (Rauch) are equally able to be coupled to the system according to the invention (this includes guidance means such as 112 and 114), as passenger information systems (125), in which an individual determining of position can be equally as sufficient for this (via e.g. GPS 126) as that of the train control system (60).

The train control system (60) is directly connected to the (automatic) dispatching system 120; it can be combined therewith out human intervention, in so far as the technical supervising authorities agree.

In a large, particularly track-guided transport system, the system according to the invention can be designed for the entire system, but also only for one (e.g. highly used) part. In order to provide a functional transition, log-in zones are provided into the system, in which the driver of a train or else an automatic driverless train checks into the system or checks out of it again (127). Both the issue of tickets via biometric control 121 and also the passenger information system 125 are connected to the system to increase the service quality 128 for the passenger, or even control this automatically, in which the information pathways from the automatic ticket machines 121 are bi-directional, and information from the passenger information system 125 can not only appear via large displays at the station and in the trains, but also in the display of the automatic machine and thus, if necessary, can affect the selection of the destination, to the benefit of the passenger.

What is described above of course applies within the framework of the invention not only locally for individual stations, and is also able to be applied in an analogous manner to the vehicles to convey people instead of to the people. It can likewise be used for a system of several stations, for example in a city. If an overload or breakdown is detected in one station or on a particular route, the guidance system can be controlled so that the passengers are distributed as evenly as possible on alternative routes, i.e. are guided onto the respective platforms for instance by the use of the guidance elements, and so that the detected situation is reacted to as regards the vehicles. The invention enables the transport operator to obtain an overview of the current passenger load on the combined system at any moment in time, and to take steps to eliminate or promptly prevent breakdowns, congestion etc., i.e. to provide the use of additional trains or to release them into operation automatically, and generally to adapt the control of vehicles to the determined data, in order to achieve as efficient a transportation of people as possible. In contrast to people, who can only be "controlled" in a limited way, the control of vehicles, particularly automatically controlled vehicles of course, can be acted upon directly by the system. Thus, for instance, additional (driverless) trains can be automatically included into the transport network, if this is required. However, even in the case of vehicles which are not controlled fully automatically, interventions can be provided, for instance automatic braking when an impending hazardous situation is detected; however, it can also be sufficient here to inform the driver promptly of the hazardous situation.

It is advantageous that with the travel ticket, each passenger receives a transmitter or chip integrated in the card, whether it is an annual, monthly, weekly or daily ticket, or a multiple- or single ticket. The transmitter can be integrated into a plastic card or can also be integrated as wiring into a printable, strong cardboard card. Other materials are also conceivable, if they are serviceable for the function. In addition, the transmitter can be integrated in comparable cards or other objects which are carried, for instance entry tickets, name badges and suchlike. The identification signal of the transmitter must in every case be clear within a system, in order to make it possible to carry out a count which is accurate with respect to people. The possibility exists to equip the transmitter with an identification which allows a conclusion to be made regarding the bearer. A clear association would be conceivable for example by means of a customer number with the respective transport operating company, in the case of (non-transferable) season tickets. The same can be used for season tickets for zoos, leisure parks, stadiums etc. In this case, the bearer would only be identifiable by the respective operator. Third parties would have no possibility of identifying them. Clear identification signals can be used, which allow the person to be identified, for instance pass numbers or the name of the bearer. The identification can be designed in accordance with existing or future data protection regulations. A count which is accurate with regard to people is possible in every case.

Every ticket which is issued—even for only one journey— receives a small transmitter (the costs for this are extremely low in large quantities). One-way tickets can be also be taken in again when leaving the means of transport, and multiple tickets on leaving, for example the underground station (barrier area) after the final journey, i.e. when cancelling validity. This is already prior art in the current ticket system in the London Underground Railway. Such a procedure therefore allows the re-use of cards which are more costly to supply, with their transmitters, pads etc., which can always be re-programmed.

In the preferred embodiment, the system according to the invention comprises a plurality of personal transmitters (for instance in the form of "smart cards"). Here, the users of the system are provided with a personal transmitter, preferably by means of the ticket, which guarantees a count which is accurate with regard to people. To do this, receiver arrangements are provided in vehicles and stations, for example. In optional embodiments, the personal transmitter can also be utilized, in connection with the receiver arrangements used, to locate people precisely; this can optionally take place either "anonymously" or in a personalized manner. The data (number of people, locations), which can be detected by the use of the personal transmitters, are evaluated and used for a variety of functions in the transport guidance system, in order to enable a prompt adaptation of the guidance system to the most varied of conditions. The transmitters serve for automatic capacity planning and resetting in the transport system, and also for maintaining security.

It is an aim of the present invention to provide a system which links the above-mentioned applications optimally with each other, can be advantageously produced and obtained and offers a high degree of accuracy. It is preferably linked to the acquisition of tickets and suchlike or even forms one unit therewith. Finally, it serves to detect the numbers of passengers for the purpose of control, security, accounting, vehicle disposition and the determining of input data to control the transport system. The local position of the transmitter carried by each person can be established by means of receiver devices which are installed in vehicles and areas, and can be visualized via a calculating programme and used for further purposes.

Such a system can be used for counting at the entry to a metro station, but also at the exit; it can be used to subsequently collect fares if a passenger has traveled too far (for instance if a passenger leaves the zone for which the ticket is valid), but also for counting people on a platform, at a train door or in a part of a train, and also to provide an accurate picture of the locations of people on a platform or in a vehicle. It enables the operator to track or follow streams of passengers, and it provides at every moment in time a picture of the people located in the system according to time and place. This picture exists until the people leave the system i.e. for example, the metro station or, in the case of a disaster, as long as no temperatures or other conditions occur, so that the passenger counting- and detecting system is no longer able to function (in this case the final measurement results are preserved). In disaster situations, it is, however, to still be capable of functioning to an extent such that it can be used for locating people—this is to be guaranteed for most cases. The cards which are carried, in so far as they have active transmitting capabilities, can detect rising temperatures and emit a warning signal, so that fires can be detected as promptly as possible.

An application of the system disclosed here for protecting buildings and people, e.g. in a fire in underground carparks or in buildings with several fire areas, is likewise included here. For example, in automatic fire protection control arrangements, which automatically close fire protection doors in the case of fire, people who are still in a fire area can be located, and can be protected before being closed in by the installation. A control can also be carried out as to whether they have used or are able to use a hand-operated escape door, which is possibly combined with the fire protection door.

A precise detection of the number of people who are situated for example in a particular area of a grandstand in a sports stadium, or in the cloakroom, VIP or other area, can likewise be guaranteed. This can be used, inter alia, in order to prevent more people remaining in a particular area than is tolerable for reasons of fire protection (concert hall) or for static reasons (football stadium).

In the case of personalized cards here the investigation can also be personalized, but it may also likewise take place in a non-personalized manner. Data filtering, as is possibly required by data protection, can be arranged before or after, or added. In any case, it is necessary that each card or each transmitter is individual in so far that it is possible to differentiate between different people. A personalization, in which person-related data are able to be obtained from the transmitter (customer number etc.) is optionally possible. In timed cards, it is necessary to encode the cards in such a way that through the identification signal it is possible to make an association with the periods of time when it is valid. This means establishing whether a passenger has a valid ticket or one which has already expired. A date-related identification signal can also be used for this.

Provision is made according to the invention that data (particularly person-related data) are cancelled after a certain period of time, in accordance with the current legal provisions for the transport system operator, possibly in accordance with national or international agreements. The operator is to guarantee that these are adhered to—possibly, the technical possibilities may exceed the possibilities for use from a legal point of view, or all technical possibilities are only utilized in special cases or under special circumstances.

If a vehicle, i.e. for instance an underground train, can undertake a determining of position, the location is thereby also known. This information can be important, for instance in the case of a power failure, a tunnel fire or a terrorist attack. However, with systems of the prior art it is not possible to establish from another location the position of every person in a tunnel system (e.g. via electronic means), or to locate a person or card when they are no longer moving (card can also have been dropped or thrown away). In the preferred embodiment of the invention, in combination with the personal transmitters, the addition of a determining of location of a vehicle is necessary, because the receiver arrangements, inter alia, can be situated in a train, which changes its position whilst travelling. In order to determine the precise position of particular people who are situated in a train, not only is the determining of position necessary in relation to the receiver arrangements, but also in addition the information as to where the respective train stops. With this combined information, the position of the passengers is then known as a whole. The determining of the position of a train can take place by known means. The determining of location can be refined, e.g. by dividing the rail system into correspondingly small sections, and detecting when a particular train stops in a particular section and in which direction it is travelling.

The following embodiments, inter alia, are able to be realized by the present invention:

When used in a mass transport system, for instance an underground railway system: With the system according to the invention, a better utilization can be achieved of the available trains and of the space in individual trains. Indirectly here, a better utilization of the infrastructure is also ensured. If an increased crowd of passengers is detected boarding in an area of a train, the passengers can be guided by the elements of the guidance system to the other, less occupied doors. The system can register the increased influx of passengers and can automatically cause more trains to be provided; in addition, the increased stream of people can already be guided in the approaches to the area, so that a large crowd can be avoided. As the passengers are preferably already detected so early (i.e. for instance already at the station entrance or concourse) that some minutes still elapse until they are standing ready to board at the platform, more trains can be provided in this time, so that the higher number of people can be transported out from the station as quickly as possible. The passengers are informed here that additional trains are being put on, so that they refrain from taking absolutely the first train. An optional possibility consists in connecting escalators, lifts etc. so that the briefly increased stream of people in one direction can be taken away without disturbance. This means that at each escalator for the inflow or outflow from the platform, briefly both are connected for access to the platform, when the system detects that several people are walking towards the platform, whereas no or only a few people are leaving the platform.

When used for increased safety in static-critical structures, for example a football stadium: Apart from the access control, the invention can be used to detect a high occupancy of a grandstand, so that suitable steps can be taken against an impending failure of the structure, in extreme cases even collapse. The same applies to transport buildings.

When used to improve rescue operations: When disasters occur, for instance fires, the system can prevent people from running inadvertently into the hazard zone, through the use of the elements of the guidance system, i.e. warning instructions on illuminated signs, acoustic announcements, mechanical blocking-off of dangerous areas etc. The stream of people can then be guided systematically, so that as far as possible no congestion occurs and a sufficient distance from furnaces is maintained. The rescue services are provided with additional information, for example whether people are still situated in a particular area. If a specific transmitter which is not moving is located within a hazard area, it can be concluded that this is a helpless person and steps can be taken. It is preferred that a check can be carried out in a fire incident, as to whether everyone has left the building or are situated in safe areas.

When used for line clear detection: If transmitters are situated in the track area, or a person or an object, which is detected by intelligence arranged in the background of the camera system, this can allow conclusions to be made that people or objects are situated there, and can therefore trigger an alarm and/or the braking of approaching trains. In this way, for example, the unfortunately frequent suicide attempts or accidents, i.e. by falling (also unintentionally) in front of oncoming trains, can be largely prevented. A combination or doubling of information for the purpose of security by means of automatic video monitoring apparatus/systems etc. is included in accordance with the invention.

Camera positions can be:
on and in the vehicle
along the route and in its surrounding area
at positions with an increased overview (e.g. satellites)

It is immaterial here whether the images are provided and transmitted expressly for the purpose according to the invention or constantly transmitted images and data are used for the purpose according to the invention and are processed correspondingly according to the purpose.

To do this, images of the route or the path of the vehicle are monitored by intelligent processing (e.g. image processing) for sudden and noticeable changes
a) before operations begin and/or after operations end (in rail-connected systems) by a slow vehicle, particularly checking for changes in quality of the track, e.g. deformations, cracks etc.
b) during operation, in particular checking for obstacles of any kind a certain period before and (e.g. with on-board camera) immediately before passing the route section at high speed.

A differentiation of the image processing is desired here, because changes also take place through daylight, brightness, darkness, shadows, heavy rain, snowflakes.

Despite the changes in image quality which are to be differentiated, the detection even of small objects is important, in order to achieve greater safety. Three-dimensional vision, inter alia, serves for this, possibly with two parallel cameras, by combining photogrammetric methods into the image processing procedure.

With the use of images from satellite transmission, images from various angles of view can be combined and evaluated.
a) camera on top of train, in metro, high speed train and also in magnetic railway
b) fixed cameras installed along the track and also in the tunnel, in the stations, sidings, at the switch points etc. and
c) satellite monitoring.

A moving image from the top of the train/top of the vehicle, one or more images of the track from the exterior, laterally or laterally from above, before and with a train travelling through, and possibly a satellite image are mixed with each other by intelligent image processing—the result is transmitted to the central computer in an analogous manner to the monitoring of people (e.g. in the station) which has already been described.

Here, the central computer controls:
1.) triggering of start-up, acceleration, deceleration and braking processes
2.) triggering of commands to system- and overall control arrangement
3.) triggering of alarm to any other possible place(s), such as monitoring personnel, rescue services, disaster protection service etc., recordings for subsequent purposes.

The structure of a route-monitoring arrangement (to be adapted to the respective building infrastructure) for example contains according to the invention
1.) cameras in the tunnel: showing the entire tunnel longitudinally and in cross-section, both directions of travel, overlapping
2.) cameras at the platform edges or at platform gates (system possibly uncoupled from main route monitoring arrangement, in order to take into account the differing speeds)
3.) cameras in the access points to the stations
4.) cameras along the track
5.) particular density of cameras at bridges, over- and underpasses, overlapping of the track with other highly sensitive transport axes e.g. motorways etc.
6.) satellite monitoring of the track (for the above-ground monitoring of the track)
7.) cameras at the top of the vehicle, for 7a) replacement of monitoring of the track by the driver in automatic, driverless travel, or b) assisting the driver, for forward vision at high speed
8.) as 7.), but for checking the track quality, evenness of the track etc.

Cameras in the train, for passenger safety from
9a.) violence by passengers to passengers
9b.) vandalism
9c.) terrorism (bags, suitcases etc.)

Access monitoring can be supplemented possibly by x-ray apparatus, explosives detectors etc.

The parameters to be monitored here are:
Intrusion, i.e. unauthorized entry by people or other creatures
objects on the path of the vehicle
objects in the structural clearance
objects on tunnel walls and ceilings
objects on tunnel walls and ceilings, objects falling in
objects on and in the vehicle
conspicuous behaviour by people
wanted persons who are using the means of transport.

Figure 11:
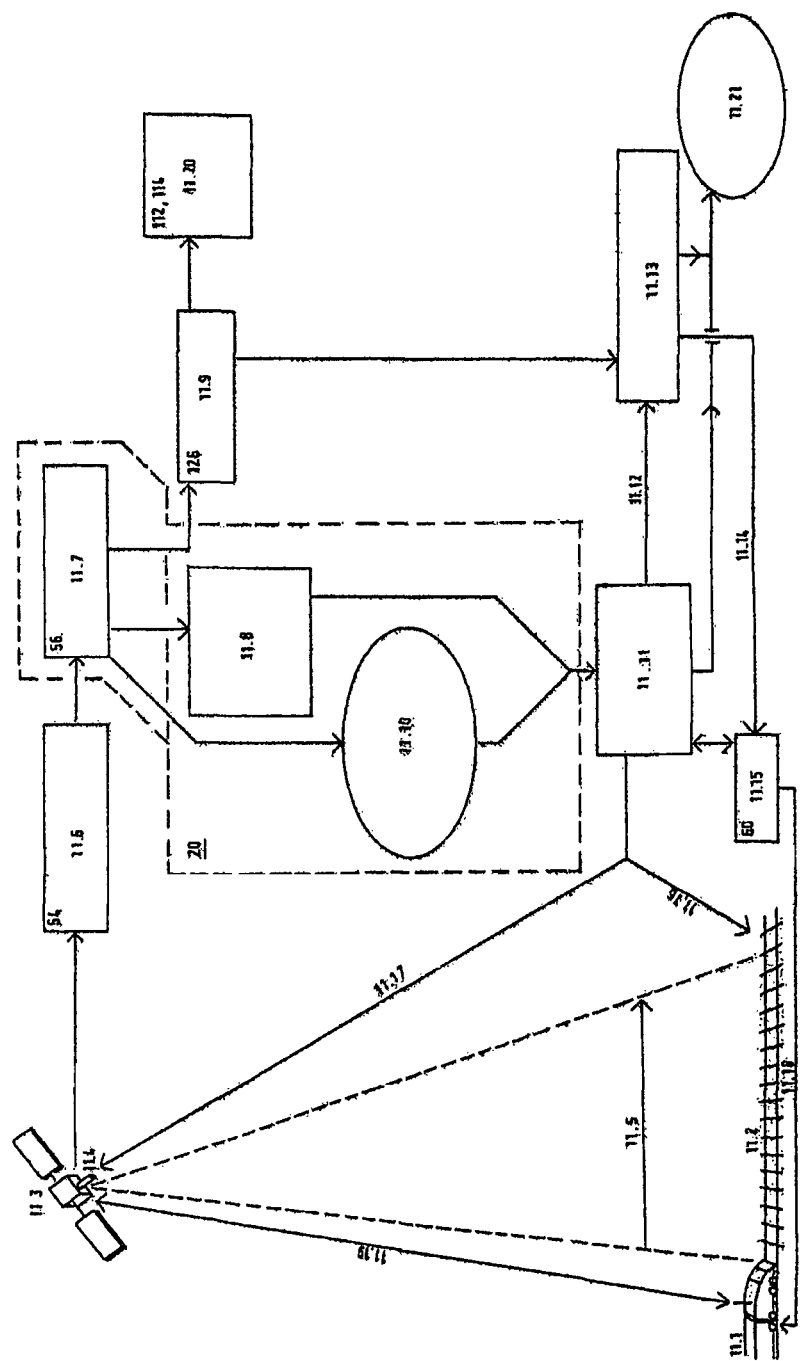
FIG. 11 shows a further embodiment which illustrates the possibilities which the system according to the invention provides for automatically securing the path of a vehicle.

FIG. 11 shows this partial system for monitoring according to the invention, described above, using the example of the satellite camera station. The diagram likewise applies to other camera positions, both for movable positions and also for a plurality of positions combined one behind the other.

A vehicle 11.1, a train in the example illustrated, is situated on and travels through a route 11.2, also a path of a vehicle, in the example shown here a rail track, but also a magnetic track, road, motorway, preferably with a defined course or track-guided. Cameras 11.4, set away from but looking over the route, for example on a satellite 11.3, are in constant data contact 11.19 with the vehicle. The cameras 11.4, or a transmitter, e.g. satellite 11.3, transmit the data 11.6 (54) of the route 11.5 to be traveled in the immediate future by the vehicle to the central computer 20, in which the latter incorporates an automatic intelligent image processing arrangement 11.7 (56) or in which this is connected in series to it. The image processing is linked to a location determining arrangement 11.9, e.g. GPS, but train number reporting systems are also conceivable, such as are known for example in rail transport, or other means for precisely determining the location of vehicles in real time. The image processing and the computer intelligence which is connected in the background allows the automatic detection of obstacles 11.8., in which preferably also a constant comparison takes place of the actual situation found by continuous camera observation with the theoretical situation, so that changes can be detected immediately. In a case where the path of the vehicle is disturbed, the data situation and its processing results lead to a reaction 11.11., e.g. automatic braking in the case of obstacles, and to triggering of an alarm 11.12 to the operating centre or control station 11.13. Automatically, or by the intervention of decisions by personnel in the operating centre, control commands 11.4 are generated, which affect or control the automatic train control 11.15 (60). Here, a command 11.6 can be triggered directly as a reaction 11.11 onto the track communication, signal technology etc., but also a command can be triggered via the continuous data communication via satellite 11.17 and 11.19.

The automatic train control 11.15 (60) can also transmit control commands by known means such as signal lights etc. via track/vehicle communication.

FIG. 12 shows a further embodiment which explains how passengers can be informed of the extent to which trains are full, and thus a corresponding behaviour on very crowded platforms can be achieved.

Indicators of train length and train position (in one) as in FIG. 12a define the prior art. Here, 12.1 describes a long train, 12.2 a full train and 12.3 a short train. 12.4 means that the position particularly of 12.2 and 12.3 can vary according to arrangement relative to the platform shape. FIG. 12b shows preferred alternatives to the representation of the train position, which according to the invention can be used for the efficient development of the changeover of passengers in the station. Its advantage lies in that the passenger is shown informatively the occupancy to be expected in the incoming train, or the distribution of passengers in the individual carriages, without giving him a compulsory recommendation. This is psychologically better and shows advantages in the invention where it is necessary to take into account the cooperation of the passengers who are to be transported. 12.5 describes a graphic indication of the degree of occupancy according to an individual train, 12.6 describes the degree of occupancy with respect to carriages, because a single train can consist of several carriages (theoretically, this can extend to being specific with respect to doors), 12.7 indicates the respective % of occupancy. If the distribution is uneven in a short train or an individual train, the % number can be indicated as an average (12.8), this being a variant which is less efficient within the invention.

FIG. 13 describes the various functions of the system according to the invention in their connections and explains in summary individual aspects at the functional links for the purpose of improving the efficiency and safety of transport systems, particularly mass transport systems. By various data detection methods, an automatic count of passengers 13.1 is obtained in a system. This is to be carried out via a biometric card system 13.8 or via video monitoring with intelligent image evaluation 13.6, and is only one of the preferred possibilities; in addition, there are infrared, light barriers, brightness- and weight comparisons etc. Firstly, through the automatic count, the passenger guidance can be controlled for efficient passenger distribution and passenger information, in which parts of this function, with the exception of obtaining data via 13.6 and 13.8, are already disclosed in EP 941 527. This single, already known line, which can be integrated into the invention, is designated by 13.3.

An aspect of the invention lies in that via the obtained knowledge of the number and distribution of passengers in the transport system 13.1, the automatic train control 13.4 and the vehicle usage control 13.5 are also influenced. Knowledge from video monitoring, combined with intelligent image processing 13.6., are likewise used to influence train control (see FIG. 11) and usage planning (see FIG. 6), i.e. to trigger actions of the elements 13.4 and 13.5, which have positive effects on the operation of vehicles in the system, preferably train operation, to improve efficiency and safety. In addition, the elements 13.8 and 13.6 can also trigger an alarm and security functions 13.7, particularly if breakdowns in the operation of the transport system occur or objects or persons enter into the system which may represent a safety risk. To do this, 13.6 and 13.8 communicate preferably with an (external) data bank 13.9., which for example holds biometric data of wanted persons who one does not wish to have in the system, in order to avoid security risks.

If an alarm is triggered 13.7, or the vehicle usage planning 13.5 increases or reduces the number of vehicles per unit of time or the number of parts of the vehicles (e.g. longer train) or changes the route direction, cancels stops etc., this is also imparted to the passenger information system (links 13.10) in addition to the functions disclosed in EP 941 527 and in addition to possible other functions.

The transmitter for data provision of the guidance system according to the invention (or several transmitters) can be contained in various objects according to the invention, which are carried by respective persons. These include travel tickets and entrance tickets, access cards, name badges and suchlike. Plastic cards or else cards of firm cardboard are suitable as carriers; the transmitters can be integrated therein or arranged thereon according to known techniques. So-called RFID chips, i.e. labels which are able to be read via radio, can be used as transmitters. These are generally passive transmitters which do not require their own current supply; however, the invention is not restricted to passive transmitters. In addition, as described above, according to the invention the detection of objects and persons who do not carry a transmitter is included in the system.

The accuracy of the determining of location of a transmitter or of a an object/person without a transmitter in the system according to the invention depends inter alia on the type of receiving areas. In the case of receiving areas (or cells) which substantially do not overlap, a locating will be restricted to establishing the location of the transmitter in specific areas which correspond to the receiving areas. Therefore, in this case, the accuracy will depend directly on the size and number of the receiving areas. In the case of overlapping receiving areas, known techniques can be used which are analogous to those in mobile radio networks, especially by means of the reception strength of the signal of a transmitter, in order to detect the position of the transmitter more accurately.

In addition to detecting whether one transmitter or how many transmitters are situated in an area, fundamentally further important data concerning passengers can be determined. As already described, the position of individual persons can be detected and used by the system. From the position or its change over time, in addition a conclusion can be made as to the basic direction and roughly the speed of a person. The direction, especially, is an extremely useful piece of information which can be used efficiently within the system of the invention. Thus it is possible, for example, in the case of streams of people who are substantially only moving in one direction (disembarking passengers leaving a train), to achieve a better utilization of escalators etc. by the guidance system. If it is detected that a large number of people are moving in a particular direction, all or at least most of the escalators can be switched to the corresponding direction, in order to achieve a quicker emptying of a platform. In an analogous manner, lifts can preferably be already moved in advance to a respective floor, in order to shorten waiting times, if foreseeably several people at once will be requesting lifts in the same direction. The speed of people, which can basically be determined, is of subordinate importance and can in any case only be roughly determined. However, it can be extremely advantageous to be informed how quickly a larger number of people is moving, in order for instance to provide trains as promptly as possible, in order to avoid large accumulations of waiting passengers.

It is noted that the variants of the invention described in FIG. 1 to 3 can also be combined with each other according to the invention, such as is shown for instance in FIG. 6. Thus, also in the most preferred embodiment, additional data from automatic ticket machines and/or access control arrangements can be added, which can provide a more differentiated picture of streams of people and the densities of people. Likewise, a greater failsafe aspect is achieved, because thereby a type of "backup" function is made possible, in that various independent sub-systems are used for determining the position of people, so that if one sub-system fails, others continue to be able to function. All conceivable combinations of the described features and devices can be provided according to requirements, and offer a high degree of flexibility and reliability in operation for users of the transport guidance system of the present invention.

The transport guidance system is not limited to fast transport means, particularly track-guided means. In driverless or automatic train systems, it displays a great effect in accordance with the invention. A possible preferred embodiment in track-guided or constant-line means of transport on the surface, such as buses, trams, city trains, light rail etc., is that surface stops are delimited spatially so that an automatic counting of the waiting passengers is possible. The delimitation can also be physical, e.g. by railings, glass walls and suchlike, and access to the waiting area can take place by the acquisition and control of the chip cards and with the described means for security checking.

The delimitation of the paths of the vehicle from the waiting areas can take place by platform gates and similar barriers, such as are disclosed for example in EP 1 053 159 B 1. Therefore, on the one hand, a certain protection of the people waiting is made possible, e.g. also from weather conditions such as cold or heat, and on the other hand it is ensured that only the correctly counted passengers, who have been pre-checked with regard to authorization to travel and security, board the means of transport.

For a public local transport system in climatically extreme regions, a variant consisting of various elements is preferred. The preferred variant is suitable both for buses and bus lines and also for tramways/tramway lines and city train vehicles/city trains (light rail). The lines travel on the surface and generally, but not compulsorily, on their own vehicle path or their own line.

The waiting passengers are accommodated in covered structural installations which are closed at the side, preferably container-like structures, in any case, however, structures with preferably a steel construction and glazing. They enter these structures to wait for the means of transport and preferably for monitoring. The structures preferably have walls with platform gates, if necessary also flexible platform gates, i.e. where there are doors for the bus or rail vehicle, doors also occur in the side of the waiting shelter on the side at which the vehicle travels. One or two of the sides which do not face the track or path of the vehicle have entry and exit doors for the passengers into and out of the waiting building.

The waiting building can also consist partially of textile structures which are erected in light construction. A certain thermal insulation must also be structurally possible, because temperature differences occur on the walls. The waiting area is climate-controlled, i.e. a comfortable waiting climate is provided by means of air-conditioning. The vehicle travels so close to the wall on the side next to the vehicle path or to the doors next to the vehicle path, that the climate in the room is not impaired by the door opening, i.e. as little as possible of the tempered air is lost. The energy supply both of the waiting area and also of the vehicles is self-sufficient, for example by means of fuel cells; the energy for this can be generated by solar systems (particularly in hot, sunny areas).

Waiting room elements can be combined longitudinally, i.e. added, also a central entrance hall with extensions, consisting of waiting room elements, is conceivable.

Security monitoring preferably exists, also as already described in connection with ticketing, at the access to the waiting areas; metal detection, detection of explosives, biometry, scanners for bags etc. are also conceivable.

In different vehicles (different doors, different lengths etc.) a radio-controlled determining of the door situation is necessary, and also possible a guidance of the passengers, i.e. sectors are specified in which boarding and disembarking take place separately. This serves for a high efficiency of the system and a reduction in waiting times (see prior art EP 1 053 159 B 1.).

A passenger guidance according to the invention requires a count of the passengers who wish to travel by the means of transport. Thereby, the line direction, frequency of the vehicles etc. can be controlled by means of the actual number of presenting passengers (traffic on demand).

What is claimed is:

1. A transport guidance system, comprising:
at least one guidance means for guiding the movement of at least one transport vehicle movable relative to a stationary embarking/disembarking area, and of people in at least the embarking/disembarking area and an entry/exit area, the embarking/disembarking area disposed between said at least one transport vehicle and said entry/exit area, said embarking/disembarking area including:
a first interface between said embarking/disembarking area and said entry/exit area, and
a second interface between said embarking/disembarking area and said at least one transport vehicle at a side of said embarking/disembarking area facing a path or track of said at least one transport vehicle;
several recording units positioned in at least the embarking/disembarking and entry/exit areas;
said recording units operative to automatically determine the number of people who are situated at a particular moment in time in a particular spatial area, wherein said number is accurate with respect to people, and to determine the direction and speed of persons;
a central unit, connected with the recording units and with the guidance means, operative to control the guidance means depending on said number, direction and speed of persons, to:
guide the movement of people in at least the entry/exit areas into particular spatial areas of the embarking/disembarking areas via said first interface to achieve an optimum distribution of people in the embarking/disembarking areas and in the at least one transport vehicle, to achieve an optimum occupancy of the at least one transport vehicle; and
guide the at least one transport vehicle for an optimum transportation of the detected people out of the particular spatial areas.

2. The transport guidance system according to claim 1 in which the recording units comprise several personal transmitters which are respectively intended to be carried by a person, in which each transmitter is operative to transmit an identification signal, and several receiver arrangements to receive the identification signals of the transmitters, and in which the receiver arrangements are operative to determine the position of a person on the basis of received identification signals.

3. The transport guidance system according to claim 2, in which the transmitters are integrated in a travel ticket or entrance ticket.

4. The transport system according to claim 2, in which the travel ticket or entrance ticket has biometric data.

5. The transport guidance system according to claim 2, in which the receiver arrangements are operative to determine the direction of movement of a person on the basis of a change in the position of a transmitter, and the central unit is operative to control the guidance means depending upon the direction of movement.

6. The transport guidance system according to claim 2, in which the receiver arrangements are operative to determine the speed of a person in relation to one or more receiver arrangements on the basis of a change in the position of a transmitter, and the central unit is operative to control the guidance means depending upon the speed.

7. The transport guidance system according to claim 2, in which the identification signal of the personal transmitter has a clear identification of a person.

8. The transport guidance system according to claim 2, in which the identification signal of the personal transmitter has validity information, in which the validity information indicates a permitted period of time, a permitted spatial area or a travel range or distance.

9. The transport guidance system according to claim 8, in which the central unit is operative to control the guidance means on the basis of the validity information, that a bearer of the transmitter is guided away or kept away from a non-permitted spatial area.

10. The transport guidance system according to claim 8, in which the receiver arrangements are operative to detect an exceeding of the period of time, the travel range or distance or entry into a non-permitted spatial area, and the central unit is operative to issue an announcement or an alarm regarding the exceeding which has taken place.

11. The transport guidance system according to claim 2, in which the central unit is operative to determine from the position, speed and/or direction of movement, a movement pattern of people, and on the basis of this movement pattern is operative to control the guidance means or can issue an announcement or an alarm concerning the occurrence of a particular movement pattern.

12. The transport guidance system according to claim 2, in which the guidance means comprises at least one of the following:
- visual guidance means;
- acoustic guidance means;
- blocking- or opening means;
- escalators, conveyor belts or lifts; and
- means for the control of particularly rail-connected, transport means.

13. The transport guidance system according to claim 2, in which a data communication takes place with the control arrangement of the transport means, so that when required transport means units can be added per unit of time or taken out of the system.

14. The transport guidance system according to claim 13, in which with an automatic control of the transport means, this increase or decrease can take place automatically without the intervention of personnel.

15. The transport guidance system according to claim 1, wherein said optimum distribution is a substantially uniform distribution.

* * * * *